(12) United States Patent
Niimura

(10) Patent No.: US 10,641,628 B2
(45) Date of Patent: May 5, 2020

(54) CLAMP-ON TYPE ULTRASONIC FLOW SENSOR

(71) Applicant: Keyence Corporation, Osaka (JP)

(72) Inventor: Hirokazu Niimura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/268,510

(22) Filed: Feb. 6, 2019

(65) Prior Publication Data

US 2019/0285449 A1 Sep. 19, 2019

(30) Foreign Application Priority Data

Mar. 14, 2018 (JP) .................................. 2018-047210

(51) Int. Cl.
*G01F 1/66* (2006.01)
*G01F 15/18* (2006.01)

(52) U.S. Cl.
CPC .............. *G01F 1/662* (2013.01); *G01F 15/18* (2013.01)

(58) Field of Classification Search
CPC .................................... G01F 1/66; G01F 15/18
See application file for complete search history.

(56) References Cited

U.S. PATENT DOCUMENTS

| | | | |
|---|---|---|---|
| 7,000,485 B2 * | 2/2006 | Ao .......................... G01F 1/662 73/861.29 |
| 7,703,337 B1 * | 4/2010 | Feller ..................... G01F 1/662 73/861.27 |
| 9,279,785 B2 * | 3/2016 | Zhang ..................... G01N 29/07 |
| 9,671,263 B2 | 6/2017 | Otsu et al. |
| 9,671,264 B2 | 6/2017 | Kashima |
| 9,696,195 B2 | 7/2017 | Ishikawa et al. |
| 10,190,896 B2 | 1/2019 | Makino et al. |
| 10,203,234 B2 | 2/2019 | Ishikawa et al. |
| 2004/0123666 A1 * | 7/2004 | Ao .......................... G01F 1/662 73/644 |

OTHER PUBLICATIONS

U.S. Appl. No. 16/268,512, filed Feb. 6, 2019 (87 pages).
U.S. Appl. No. 16/268,513, filed Feb. 6, 2019 (88 pages).
U.S. Appl. No. 16/268,514, filed Feb. 6, 2019 (99 pages).

* cited by examiner

*Primary Examiner* — Jewel V Dowtin
(74) *Attorney, Agent, or Firm* — Kilyk & Bowersox, PLLC

(57) ABSTRACT

To provide a clamp-on type ultrasonic flow sensor capable of calculating a flow rate of fluid flowing in a pipe. An elastic couplant 114 is supported on a pipe P by a clamp member 130 such that a pipe contact section T1 is in contact with the pipe P. The pipe contact section T1 is surrounded by a damping material 116 between the clamp member 130 and the pipe. An elastic couplant 124 is supported on the pipe by a clamp member 140 such that a pipe contact section T2 is in contact with the pipe. The pipe contact section T2 is surrounded by a damping material 126 between the clamp member 140 and the pipe. The clamp members 130 and 140 are coupled to each other to sandwich the pipe in a state in which the clamp members 130 and 140 respectively press the damping materials 116 and 126.

13 Claims, 11 Drawing Sheets

CLAMP-ON TYPE ULTRASONIC FLOW SENSOR

CROSS-REFERENCE TO RELATED APPLICATIONS

The present application claims foreign priority based on Japanese Patent Application No. 2018-047210, filed Mar. 14, 2018, the contents of which is incorporated herein by reference.

BACKGROUND OF THE INVENTION

1. Field of the Invention

The present invention relates to a clamp-on type ultrasonic flow sensor that calculates a flow rate of fluid flowing in a pipe.

2. Description of Related Art

There is known a clamp-on type ultrasonic flow sensor capable of calculating a flow rate of fluid flowing in a pipe in a state in which the clamp-on type ultrasonic flow sensor is attached to the pipe by a clamp member (see, for example, JP-A-2016-217733 (Patent Literature 1)).

The clamp-on type ultrasonic flow sensor (an ultrasonic flow switch) of Patent Literature 1 includes a pair of ultrasonic elements that performs transmission and reception of an ultrasonic wave. The ultrasonic wave is transmitted to the fluid flowing in the pipe by one ultrasonic element. The ultrasonic wave passed through the fluid is received by the other ultrasonic element. A flow rate of the fluid is calculated on the basis of the ultrasonic wave transmitted and received by the pair of ultrasonic elements.

SUMMARY OF THE INVENTION

In the clamp-on type ultrasonic flow sensor, a component propagated in a peripheral wall of the pipe without passing through the fluid is present in the ultrasonic wave that reaches from one ultrasonic element to the other ultrasonic element. Such a component is an unnecessary component not having information concerning a flow rate of the fluid. When the unnecessary component of the ultrasonic wave is large, it is difficult to accurately calculate a flow rate of the fluid. Therefore, it is necessary to separate a component of the ultrasonic wave passing through the fluid from the unnecessary component and receive the component of the ultrasonic wave.

When the diameter of the pipe is large, the pair of ultrasonic elements can be disposed to be separated from each other. Propagation velocity of the ultrasonic wave in a resin material is lower than propagation velocity of the ultrasonic wave in a metal material. Further, an attenuation rate of the ultrasonic wave in the resin material is larger than an attenuation rate of the ultrasonic wave in the metal material. Therefore, when the diameter of the pipe is large or the pipe is formed of the resin material, the pair of ultrasonic elements can be easily disposed such that the component of the ultrasonic wave passing through the fluid is temporally or spatially separated from the unnecessary component and received.

However, when the diameter of the pipe is small and the pipe is formed of the metal material, it is not easy to dispose the pair of ultrasonic elements such that the component of the ultrasonic wave passing through the fluid is separated from the unnecessary component and received. Therefore, a flow rate of the fluid flowing in the metal pipe having the small diameter cannot be calculated.

An object of the present invention is to provide a clamp-on type ultrasonic flow sensor capable of calculating a flow rate of fluid flowing in a metal pipe having a small diameter.

(1) A clamp-on type ultrasonic flow sensor according to the present invention is a clamp-on type ultrasonic flow sensor that measures a flow rate of fluid flowing in a pipe, the clamp-on type ultrasonic flow sensor including: a first ultrasonic element configured to transmit and receive an ultrasonic wave; a first wedge material configured to propagate the ultrasonic wave transmitted from the first ultrasonic element and including a first incident/emitting surface that inclines with respect to a propagating direction of the ultrasonic wave and emits the propagated ultrasonic wave; a first elastic couplant including a first pipe contact section in contact with the pipe and configured to propagate the ultrasonic wave emitted from the first incident/emitting surface of the first wedge material to the pipe via the first pipe contact section; a first clamp member configured to support the pipe and support the first elastic couplant to dispose the first pipe contact section along an axial direction of the pipe; a first damping material disposed to attenuate the ultrasonic wave and surround the first pipe contact section of the first elastic couplant between the first clamp member and the pipe; a second ultrasonic element configured to transmit and receive the ultrasonic wave between the second ultrasonic element and the first ultrasonic element across the pipe; a second wedge material configured to propagate an ultrasonic wave transmitted from the second ultrasonic element and including a second incident/emitting surface that inclines with respect to a propagating direction of the ultrasonic wave and emits the propagated ultrasonic wave; a second elastic couplant including a second pipe contact section in contact with the pipe and configured to propagate the ultrasonic wave emitted from the second incident/emitting surface of the second wedge material to the pipe via the second pipe contact section; a second clamp member configured to support the pipe and support the second elastic couplant to dispose the second pipe contact section along the axial direction; a second damping material disposed to attenuate the ultrasonic wave and surround the second pipe contact section of the second elastic couplant between the second clamp member and the pipe; and a flow-rate calculating section configured to calculate a flow rate of the fluid flowing in the pipe on the basis of the ultrasonic wave transmitted and received between the first ultrasonic element and the second ultrasonic element. The first clamp member and the second clamp member are coupled to each other to sandwich the pipe in a state in which the first clamp member presses the first damping material and the second clamp member presses the second damping material.

In this clamp-on type ultrasonic flow sensor, the ultrasonic wave is transmitted and received between the first ultrasonic element and the second ultrasonic element across the pipe. The ultrasonic wave transmitted from the first ultrasonic element is propagated by the first wedge material and emitted from the first incident/emitting surface that inclines with respect to the propagating direction of the ultrasonic wave. The first elastic couplant is supported on the pipe by the first clamp member such that the first pipe contact section is in contact with the pipe and disposed along the axial direction. The first elastic couplant propagates the ultrasonic wave emitted from the first incident/emitting surface of the first wedge material to the pipe via the first pipe contact section. The first damping material is disposed to attenuate the ultrasonic wave and surround the first pipe contact section of the first elastic couplant between the first clamp member and the pipe.

The ultrasonic wave transmitted from the second ultrasonic element is propagated by the second wedge material and emitted from the second incident/emitting surface that inclines with respect to the propagating direction of the ultrasonic wave. The second elastic couplant is supported on the pipe by the second clamp member such that the second pipe contact section is in contact with the pipe and disposed along the axial direction. The second elastic couplant propagates the ultrasonic wave emitted from the second incident/emitting surface of the second wedge material to the pipe via the second pipe contact section. The second damping material is disposed to attenuate the ultrasonic wave and surround the second pipe contact section of the second elastic couplant between the second clamp member and the pipe. The first clamp member and the second clamp member are coupled to each other to sandwich the pipe in a state in which the first damping material is pressed by the first clamp member and the second damping material is pressed by the second clamp member.

With the configuration explained above, the ultrasonic wave is excited in the peripheral wall of the pipe by vibration. It is possible to transmit and receive the ultrasonic wave between the first ultrasonic element and the second ultrasonic element across the pipe using the excited ultrasonic wave. In this case, an unnecessary component of the ultrasonic wave propagated in the peripheral wall of the pipe without passing through the fluid and transmitted and received between the first ultrasonic element and the second ultrasonic element decreases. Therefore, it is easy to calculate a flow rate of the fluid flowing in the pipe on the basis of the ultrasonic wave transmitted and received between the first ultrasonic element and the second ultrasonic element.

The first damping material is pressed against the pipe in a state in which the first damping material surrounds the first pipe contact section. The second damping material is pressed against the pipe in a state in which the second damping material surrounds the second pipe contact section. Therefore, vibration of a portion of the pipe excluding a contact portion of the first and second pipe contact sections is prevented. A component of the ultrasonic wave propagated in the circumferential direction in the peripheral wall of the pipe is attenuated by the first and second damping materials. Consequently, the unnecessary component of the ultrasonic wave propagated in the peripheral wall of the pipe without passing through the fluid and transmitted and received between the first ultrasonic element and the second ultrasonic element further decreases.

The ultrasonic wave propagated in the axial direction in the peripheral wall of the pipe is prevented from reflecting on the end face of the peripheral wall in the axial direction and returning by the first and second damping materials. Therefore, the returned ultrasonic wave does not excite the ultrasonic wave at unnecessary timing. As a result, it is possible to calculate a flow rate of the fluid flowing in the metal pipe having the small diameter.

(2) The clamp-on type ultrasonic flow sensor may further include: a first pressing member attached to the first clamp member and configured to press the first damping material against the pipe; and a second pressing member attached to the second clamp member and configured to press the second damping material against the pipe. In this case, the first and second damping materials are sufficiently pressed against the pipe, whereby the ultrasonic wave propagated in the peripheral wall of the pipe is sufficiently attenuated. Consequently, it is possible to more accurately calculate a flow rate of the fluid.

(3) The first pressing member may be a first thin leaf spring, both ends in a circumferential direction of which are arcuate cantilevers with respect to a fixed part attached to the first clamp member, and may press the first damping material against the pipe also in a direction different from a clamping direction of the first and second clamp members, and the second pressing member may be a second thin leaf spring, both ends in the circumferential direction of which are arcuate cantilevers with respect to a fixed part attached to the second clamp member, and may press the second damping material against the pipe also in a direction different from the clamping direction of the first and second clamp members.

In this case, simply by clamping the pipe between the first and second clamp members, the first and second damping materials are also pressed against the pipe in a direction different from the clamping direction of the first and second clamp members by the first and second thin leaf springs. Consequently, it is possible to sufficiently attenuate the unnecessary component of the ultrasonic wave propagated in the peripheral wall of the pipe.

(4) The first thin leaf spring may have a semi-cylindrical shape and may be disposed to surround the entire circumferential direction of the pipe and press the first damping material, and the second thin leaf spring may have a semi-cylindrical shape and may be disposed to surround the entire circumferential direction of the pipe and press the second damping material. In this case, the first and second damping materials are pressed against the pipe also in a direction different from the clamping direction of the first and second clamp members over the entire circumferential direction of the pipe by the first and second thin leaf springs. Consequently, it is possible to more sufficiently attenuate the unnecessary component of the ultrasonic wave propagated in the peripheral wall of the pipe.

(5) A space for allowing deformation of the first and second damping materials may be formed between the first clamp member and the pipe and between the second clamp member and the pipe. With this configuration, even when there is an error or fluctuation in the outer diameter of the pipe, the first damping material is deformed, whereby the first damping material can be more surely pressed against the pipe by the first clamp member. Similarly, the second damping material is deformed, whereby the second damping material can be more surely pressed against the pipe by the second clamp member.

(6) The first and second damping materials may be formed by an elastic body. With this configuration, even when there is an error or fluctuation in the outer diameter of the pipe, the first damping material is deformed, whereby the first damping material can be more surely pressed against the pipe by the first clamp member. Similarly, the second damping material is deformed, whereby the second damping material can be surely pressed against the pipe by the second clamp member.

(7) The first pressing member may be configured to retain a position and a posture of the first elastic couplant, and the second pressing member may be configured to retain a position and a posture of the second elastic couplant. With this configuration, even when the first and second pipe contact sections are pressed against the pipe, a change in the width of the first and second pipe contact sections is restricted. Bending, meandering, and deformation of the first and second pipe contact sections are prevented. Consequently, it is possible to accurately calculate a flow rate of the fluid flowing in the metal pipe having the small diameter.

(8) The first pressing member may include a third slit extending along the axial direction, the first pipe contact section of the first elastic couplant being fit in the third slit, and the second pressing member may include a fourth slit extending along the axial direction, the second pipe contact section of the second elastic couplant being fit in the fourth slit. In this case, it is possible to easily press the first damping material against the pipe with the first pressing member while bringing the first pipe contact section into contact with the pipe. Similarly, it is possible to easily press the second damping material against the pipe with the second pressing member while bringing the second pipe contact section into contact with the pipe.

(9) At least one clamp member of the first and second clamp members may include a guide wall that guides the clamp member to the pipe when the clamp member supports the pipe. In this case, it is possible to easily support the pipe with the first or second clamp member.

(10) The peripheral wall of the pipe may include a first excitation region with which a longitudinal wave of the ultrasonic wave emitted from the first incident/emitting surface of the first wedge material collides and a second excitation region with which a longitudinal wave of the ultrasonic wave emitted from the second incident/emitting surface of the second wedge material collides, the first excitation region of the pipe may excite the ultrasonic wave that passes through the fluid flowing in the pipe and travels to the second ultrasonic element, and the second excitation region of the pipe may excite the ultrasonic wave that passes through the fluid flowing in the pipe and travels to the first ultrasonic element. In this case, it is possible to calculate a flow rate of the fluid flowing in the pipe on the basis of the ultrasonic waves generated from the first and second excitation regions of the pipe.

(11) The first damping material may be attached to the pipe to surround the first excitation region, and the second damping material may be attached to the pipe to surround the second excitation region. In this case, vibration of a portion of the pipe excluding the first and second excitation regions is further prevented. Components of the ultrasonic wave propagated in the circumferential direction and the axial direction in the peripheral wall of the pipe are further attenuated by the first and second damping materials. Consequently, it is possible to more accurately calculate a flow rate of the fluid flowing in the metal pipe having the small diameter.

(12) The first wedge material may be provided to set an incident angle of a shearing wave of the ultrasonic wave transmitted from the first ultrasonic element with respect to the axial direction to a critical angle or more, and the second wedge material may be provided to set an incident angle of a shearing wave of the ultrasonic wave transmitted from the second ultrasonic element with respect to the axial direction to the critical angle or more.

In this case, the ultrasonic waves emitted from the first and second pipe contact sections are totally reflected by the pipe and hardly intrude into the peripheral wall of the pipe. Consequently, it is possible to further reduce the unnecessary component of the ultrasonic wave propagated in the peripheral wall of the pipe without passing through the fluid and transmitted and received between the first ultrasonic element and the second ultrasonic element.

(13) An outer diameter of the pipe may be 2 mm or more and 20 mm or less. With this configuration, even when the outer diameter of the metal pipe is sufficiently small, it is possible to calculate a flow rate of the fluid.

According to the present invention, it is possible to calculate a flow rate of fluid flowing in a metal pipe having a small diameter.

DESCRIPTION OF EMBODIMENTS (1) Schematic Configuration of a Clamp-on Type Ultrasonic Flow Sensor A clamp-on type ultrasonic flow sensor (hereinafter abbreviated as flow sensor) according to an embodiment of the present invention is explained with reference to the drawings. In the following explanation, a direction along the center axis of a pipe is referred to as axial direction. A direction along a peripheral wall of the pipe is referred to as circumferential direction. A direction inclining with respect to the axial direction by a predetermined angle is referred to as inclining direction. A direction orthogonal to the axial direction and the inclining direction is referred to as width direction. A direction orthogonal to the inclining direction and the width direction is referred to as length direction.

Figure 1:
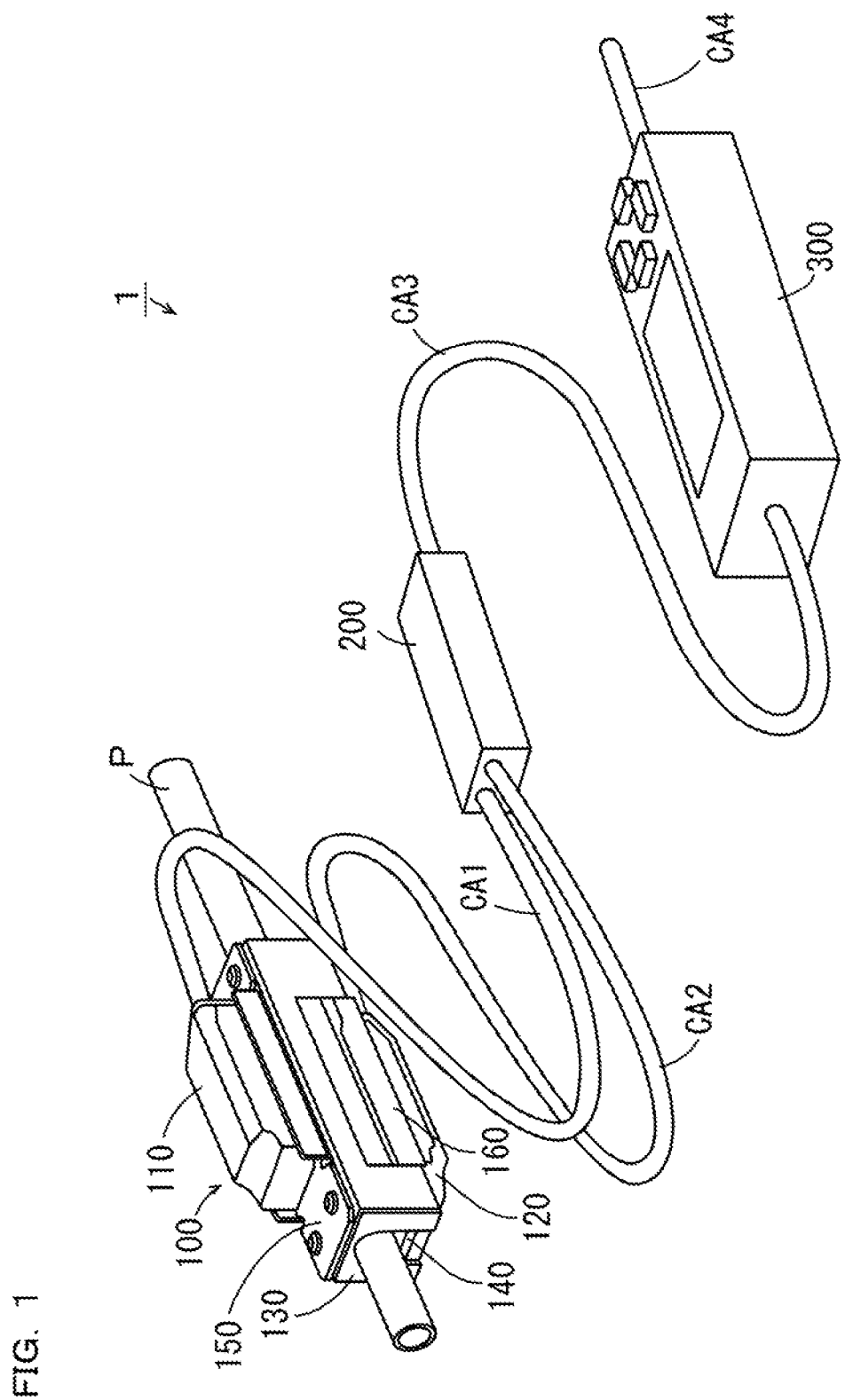
FIG. 1 is an exterior perspective view of a flow sensor according to an embodiment of the present invention.

FIG. 1 is an exterior perspective view of the flow sensor according to the embodiment of the present invention. As shown in FIG. 1, a flow sensor 1 according to this embodiment is configured from a head section 100, a relay section 200, and a main body section 300. The head section 100 includes two sensor heads 110 and 120 and two clamp members 130 and 140. The head section 100 further includes two attachment sheet metals 150 and 160 for attaching parts of the sensor heads 110 and 120 to the clamp members 130 and 140. The clamp members 130 and 140 are formed of, for example, a metal material.

The sensor heads 110 and 120 are attached to the outer circumferential surface of a peripheral wall of a pipe P in a state in which the sensor heads 110 and 120 are respectively held by the clamp members 130 and 140. In this embodiment, the pipe P is a metal pipe having a relatively small diameter. The diameter (the outer diameter) of the pipe P is, for example, 2 mm or more and 20 mm or less. Fluid flows in the pipe P.

A head cable CA1 is connected between the sensor head 110 and the relay section 200. A head cable CA2 is connected between the sensor head 120 and the relay section 200. A relay cable CA3 is connected between the relay section 200 and the main body section 300. One end of a main body cable CA4 is further connected to the main body section 300. The other end of the main body cable CA4 is connected to an external apparatus (not shown in FIG. 1) of the flow sensor 1. The external apparatus is, for example, a personal computer or a programmable logic controller. Details of the relay section 200 and the main body section 300 are explained below.

Figure 2:
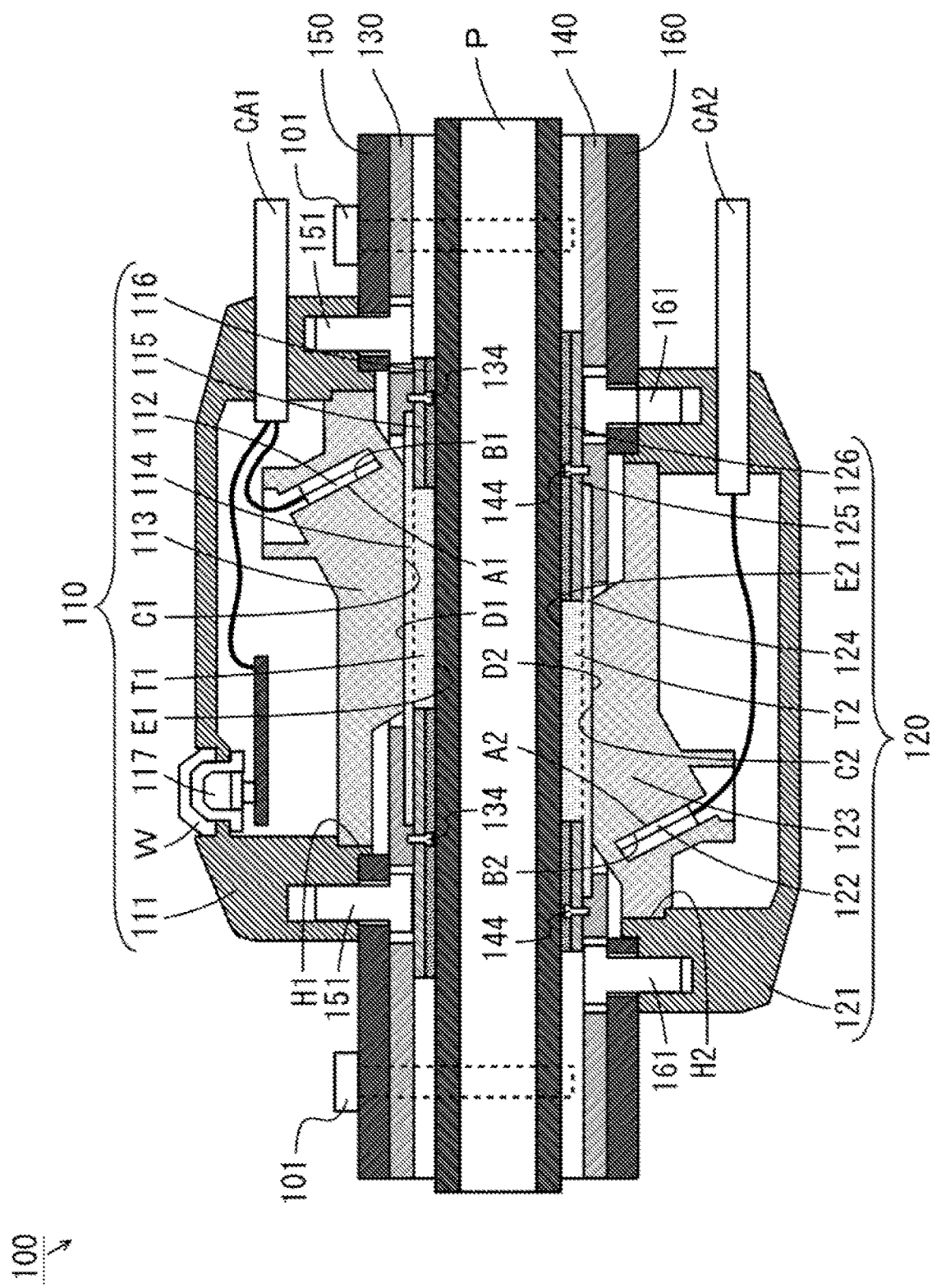
FIG. 2 is a cross sectional view showing an internal configuration of a head section shown in FIG. 1.

FIG. 2 is a cross sectional view showing an internal configuration of the head section 100 shown in FIG. 1. As shown in FIG. 2, the sensor head 110 includes a casing 111, an ultrasonic element 112, a wedge material 113, an elastic couplant 114, a leaf spring 115, a damping material 116, and a display lamp 117.

The casing 111 is formed of, for example, a resin material and has an elongated shape (in this example, a substantially rectangular parallelepiped shape) extending along the axial direction. In the following explanation, in the casing 111, a direction facing the pipe P is defined as lower direction and the opposite direction of the lower direction is defined as upper direction. The up-down direction of the casing 111 is orthogonal to the axial direction and the width direction. A window section W formed by a transparent member is formed on the upper surface of the casing 111. An opening H1 is formed in a lower part of the casing 111.

The ultrasonic element 112 includes a transmission/reception surface A1 capable of transmitting and receiving an ultrasonic wave. The wedge material 113 is formed of a non-metal material having high rigidity and high acoustic transparency. The wedge material 113 is desirably formed of a material having high environment resistance. The wedge material 113 includes a joining surface B1 facing the inclining direction and includes, in a lower part, an incident/emitting surface C1 facing downward. The transmission/reception surface A1 of the ultrasonic element 112 is joined to the joining surface B1 of the wedge material 113 by a not-shown acoustic adhesive.

The wedge material 113 is attached to the lower part of the casing 111 via a not-shown seal member to close the opening H1. Consequently, a space into which liquid such as water and oil cannot intrude is formed on the inside of the casing 111. The ultrasonic element 112 is housed on the inside of the casing 111. The incident/emitting surface C1 of the wedge material 113 slightly projects downward from the opening H1 of the casing 111. In this state, the casing 111 is attached to the attachment sheet metal 150 by two attachment screws 151. A resin member is filled in the inside of the casing 111.

The elastic couplant 114 has a solid shape and is formed of a soft elastic material made of polymeric rubber or a gel substance. The hardness of the elastic couplant 114 is, for example, 20 degrees to 40 degrees. In a lower part of the elastic couplant 114, a pipe contact section T1 projecting downward to be capable of coming into contact with the pipe P is formed over a predetermined length in the axial direction.

The elastic couplant 114 is disposed in contact with the incident/emitting surface C1 of the wedge material 113 and the pipe P to thereby match acoustic impedances of the wedge material 113 and the pipe P. A contact surface with the wedge material 113 in the elastic couplant 114 is referred to as wedge contact surface D1. A contact surface with the pipe P in the pipe contact section T1 of the elastic couplant 114 is referred to as pipe contact surface E1.

The leaf spring 115 is disposed to surround the pipe contact section T1 in the circumferential direction and the axial direction and attached to the clamp member 130 together with the elastic couplant 114 by two attachment screws 134. The damping material 116 is formed of, for example, an elastic body that attenuates an ultrasonic wave in the pipe P and disposed between the leaf spring 115 and the pipe P to surround the pipe contact section T1 in the circumferential direction and the axial direction.

As explained below, the flow sensor 1 is capable of operating also as a flow switch that changes a state of a switching signal (an ON/OFF signal) to the external apparatus on the basis of whether the fluid is flowing in the pipe P at a flow rate equal to or higher than a threshold. The display lamp 117 includes, for example, a plurality of light emitting diodes that emit lights in different colors. The display lamp 117 is lit or flashed in a plurality of kinds of forms according to operation states of the flow switch on the basis of control by the relay section 200 shown in FIG. 1.

In this embodiment, the display lamp 117 is lit in green when the external apparatus is in an ON state and is lit in red when the external apparatus is in an OFF state. The display lamp 117 may be lit when the external apparatus is in the ON state and may be extinguished when the external apparatus is in the OFF state. Conversely, the display lamp 117 may be extinguished when the external apparatus is in the ON state and may be lit when the external apparatus is in the OFF state.

The display lamp 117 is disposed on the inside of the casing 111 in close contact with the window section W. Consequently, a form of the operation of the display lamp 117 can be visually recognized from the outside of the casing 111 through the window section W. A user can easily distinguish the ON state and the OFF state of the external apparatus by visually recognizing a color, a lighting state, or the like of the display lamp 117.

The sensor head 120 includes a casing 121, an ultrasonic element 122, a wedge material 123, an elastic couplant 124, a leaf spring 125, and a damping material 126. The casing 121 has the same configuration as the configuration of the casing 111 except that the window section W is not formed. Therefore, an opening H2 same as the opening H1 is formed in the casing 121.

The ultrasonic element 122 and the wedge material 123 respectively have the same configurations as the configurations of the ultrasonic element 112 and the wedge material 113. Therefore, the ultrasonic element 122 includes a transmission/reception surface A2 same as the transmission/reception surface A1. The wedge material 123 includes a joining surface B2 and an incident/emitting surface C2 respectively same as the joining surface B1 and the incident/emitting surface C1. The transmission/reception surface A2 of the ultrasonic element 122 is joined to the joining surface B2 of the wedge material 123. The casing 121 is attached to the attachment sheet metal 160 by two attachment screws 161 in a state in which the wedge material 123 is attached.

The elastic couplant 124 has the same configuration as the configuration of the elastic couplant 114. Therefore, the elastic couplant 124 includes a pipe contact section T2, a wedge contact surface D2, and a pipe contact surface E2 respectively same as the pipe contact section T1, the wedge contact surface D1, and the pipe contact surface E1. The elastic couplant 124 is disposed in contact with the incident/emitting surface C2 of the wedge material 123 and the pipe P to thereby match acoustic impedances of the wedge material 123 and the pipe P.

The leaf spring 125 and the damping material 126 respectively have the same configurations as the configurations of the leaf spring 115 and the damping material 116. The leaf spring 125 is disposed to surround the pipe contact section T2 in the circumferential direction and the axial direction and attached to the clamp member 140 together with the elastic couplant 124 by two attachment screws 144. The damping material 126 is disposed between the leaf spring 125 and the pipe P to surround the pipe contact section T2 in the circumferential direction and the axial direction.

The attachment sheet metal 150 and the attachment sheet metal 160 are coupled to each other by four coupling screws 101 to sandwich the clamp member 130, the pipe P, and the clamp member 140. Consequently, the sensor head 110 is attached to the clamp member 130 in a state in which the elastic couplant 114 and the damping material 116 are pressed against the pipe P by the clamp member 130. Similarly, the sensor head 120 is attached to the clamp member 140 in a state in which the elastic couplant 124 and the damping material 126 are pressed against the pipe P by the clamp member 140.

(2) Calculation Method for a Flow Rate

Figure 3:
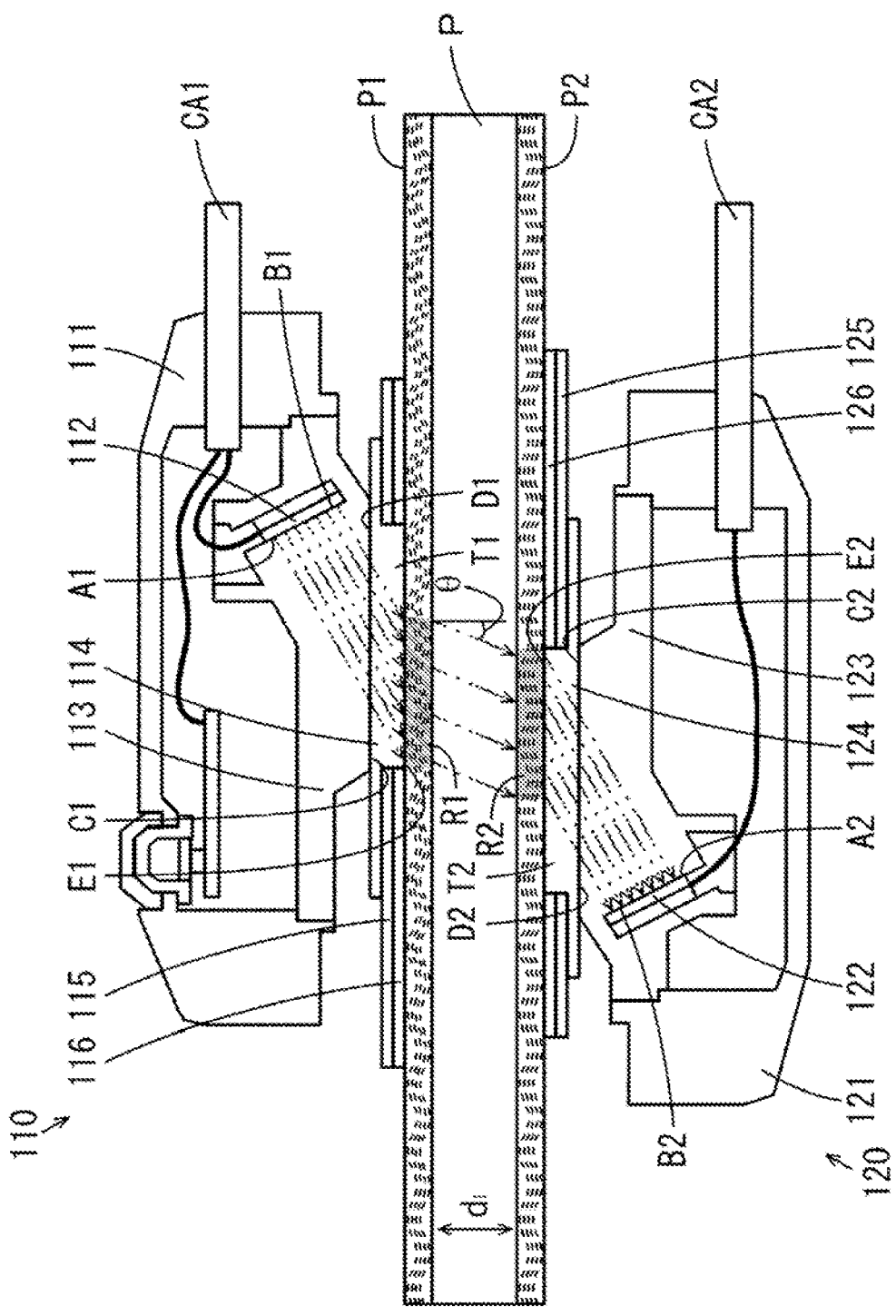
FIG. 3 is a diagram for explaining a calculation method for a flow rate in the flow sensor shown in FIG. 1.

FIG. 3 is a diagram for explaining a calculation method for a flow rate in the flow sensor 1 shown in FIG. 1. In FIG. 3, illustration of the clamp members 130 and 140 and the attachment sheet metals 150 and 160 is omitted. As shown in FIG. 3, the ultrasonic element 112 and the ultrasonic element 122 are disposed in a state in which the ultrasonic element 112 and the ultrasonic element 122 are offset from each other in the axial direction.

The ultrasonic element 112 transmits an ultrasonic wave in the inclining direction from the transmission/reception surface A1 on the basis of the control by the relay section 200 shown in FIG. 1. The transmitted ultrasonic wave is made incident in the wedge material 113 from the joining surface B1. Thereafter, the ultrasonic wave is propagated in the wedge material 113 and transmitted from the incident/emitting surface C1. The ultrasonic wave transmitted from the incident/emitting surface C1 is made incident in the elastic couplant 114 from the wedge contact surface D1, propagated in the elastic couplant 114, and thereafter emitted from the pipe contact surface E1 of the pipe contact section T1 toward the pipe P.

In this embodiment, in the wedge material 113, the joining surface B1 and the incident/emitting surface C1 are formed to set an incident angle of a transverse wave (a shearing wave) with respect to the axial direction to the critical angle or more. In this case, the longitudinal wave and the transverse wave of the ultrasonic wave emitted from the pipe contact surface E1 are totally reflected by a peripheral wall P1 of the pipe P and hardly intrude into the peripheral wall P1. On the other hand, the longitudinal wave of the ultrasonic wave collides with the outer circumferential surface of the peripheral wall P1, whereby the guide wave is excited in the peripheral wall P1. The guide wave is an ultrasonic wave propagated in a direction parallel to the axial direction in the pipe P. As the guide wave, a plate wave, a surface wave, or the like is present. A plurality of vibration modes are present in the guide wave. The guide wave has a characteristic that phase velocity and group velocity of the guide wave and a state of vibration of the guide wave are different according to a product of a frequency of the ultrasonic wave and the thickness of the peripheral wall P1 and the vibration modes.

The guide wave in the peripheral wall P1 collides with the inner circumferential surface of the peripheral wall P1, whereby the ultrasonic wave is excited to pass through the fluid and travel to a peripheral wall P2 opposed to the peripheral wall P1 at a predetermined incident angle θ. A longitudinal wave of the ultrasonic wave passed through the fluid collides with the inner circumferential surface of the peripheral wall P2, whereby the guide wave is excited in the peripheral wall P2. The guide wave in the peripheral wall P2 collides with the outer circumferential surface of the peripheral wall P2, whereby the longitudinal wave of the ultrasonic wave traveling from the pipe P to the pipe contact surface E2 of the elastic couplant 124 is excited.

The ultrasonic wave traveling from the pipe P is made incident in the pipe contact section T2 from the pipe contact surface E2, propagated in the elastic couplant 124, and emitted from the wedge contact surface D2. The ultrasonic wave emitted from the wedge contact surface D2 is made incident in the wedge material 123 from the incident/emitting surface C2 and thereafter propagated in the wedge material 123 and emitted from the joining surface B2. Thereafter, the ultrasonic wave is received from the transmission/reception surface A2 of the ultrasonic element 122 on the basis of the control by the relay section 200.

In this way, an excitation region R1 with which the longitudinal wave of the ultrasonic wave emitted from the ultrasonic element 112 collides is provided in the peripheral wall P1. The excitation region R1 is a region that mainly excites the ultrasonic wave passing through the fluid that flows in the pipe P and traveling to the ultrasonic element 122. In FIG. 3, the excitation region R1 is indicated by a hatching pattern.

Subsequently, the ultrasonic element 122 transmits the ultrasonic wave in the inclining direction from the transmission/reception surface A2 on the basis of the control by the relay section 200. The transmitted ultrasonic wave is made incident in the wedge material 123 from the joining surface B2. Thereafter, the ultrasonic wave is propagated in the wedge material 123 and transmitted from the incident/emitting surface C2. The ultrasonic wave transmitted from the incident/emitting surface C2 is made incident in the elastic couplant 124 from the wedge contact surface D2, propagated in the elastic couplant 124, and thereafter emitted from the pipe contact surface E2 of the pipe contact section T2 toward the pipe P.

In this embodiment, in the wedge material 123, the joining surface B2 and the incident/emitting surface C2 are formed to set an incident angle of the transverse wave of the ultrasonic wave with respect to the axial direction to the critical angle or more. In this case, the longitudinal wave and the transverse wave of the ultrasonic wave emitted from the pipe contact surface E2 are totally reflected by the peripheral wall P2 of the pipe P and hardly intrude into the peripheral wall P2. On the other hand, the longitudinal wave of the ultrasonic wave collides with the outer circumferential surface of the peripheral wall P2, whereby the guide wave is excited in the peripheral wall P2.

The guide wave in the peripheral wall P2 collides with the inner circumferential surface of the peripheral wall P2, whereby the ultrasonic wave is generated to pass through the fluid and travel to the peripheral wall P1 opposed to the peripheral wall P2 at the predetermined incident angle θ. The longitudinal wave of the ultrasonic wave passed through the fluid collides with the inner circumferential surface of the peripheral wall P1, whereby the guide wave is excited in the peripheral wall P1. The guide wave in the peripheral wall P1 collides with the outer circumferential surface of the peripheral wall P1, whereby the longitudinal wave of the ultrasonic wave traveling from the pipe P to the pipe contact surface E1 of the elastic couplant 114 is excited.

The ultrasonic wave traveling from the pipe P is made incident in the pipe contact section T1 from the pipe contact surface E1, propagated in the elastic couplant 114, and emitted from the wedge contact surface D1. The ultrasonic wave emitted from the wedge contact surface D1 is made incident in the wedge material 113 from the incident/emitting surface C1 and thereafter propagated in the wedge material 113 and emitted from the contact surface B1. Thereafter, the ultrasonic wave is received from the transmission/reception surface A1 of the ultrasonic element 112 on the basis of the control by the relay section 200.

In this way, an excitation region R2 with which the longitudinal wave of the ultrasonic wave emitted from the ultrasonic element 122 collies is provided in the peripheral wall P2. The excitation region R2 is a region that mainly excites the ultrasonic wave passing through the fluid that flows in the pipe P and traveling to the ultrasonic element 122. In FIG. 3, the excitation region R2 is indicated by a dot pattern.

A difference between a propagation time of the ultrasonic wave from the ultrasonic element 112 to the ultrasonic element 122 and a propagation time of the ultrasonic wave from the ultrasonic element 122 to the ultrasonic element 112 is referred to as time difference Δt. A flow rate Q of the fluid flowing in the pipe P is calculated by the following Expression (1) on the basis of the time difference Δt. In Expression (1), $d_1$ represents the inner diameter of the pipe P, $V_s$ represents velocity of the ultrasonic wave in the fluid, θ represents an incident angle of the ultrasonic wave in the fluid, and K represents a flow rate correction coefficient for converting velocity of the fluid having a predetermined distribution in the cross section of the pipe P into average velocity. The velocity $V_s$, the incident angle θ, and the flow rate correction coefficient K are known. The user can set the inner diameter $d_1$ of the pipe P by operating the main body section 300 shown in FIG. 1.

$$Q = \frac{1}{K} \cdot \frac{\pi d_1 V_s^2}{8\tan\theta} \Delta t \quad (1)$$

The flow sensor 1 is also capable of operating as a flow switch. The user can set a threshold of a flow rate by operating the main body section 300. The main body section 300 compares the flow rate Q calculated by the Expression (1) with the set threshold and outputs an ON/OFF signal to the external apparatus on the basis of a result of the comparison. The ON/OFF signal is a signal for switching the ON state and the OFF state of the external apparatus connected to the main body section 300 through the main body cable CA4 shown in FIG. 1. The display lamp 117 shown in FIG. 2 is lit to be capable of distinguishing the ON state and the OFF state of the external apparatus.

(3) Details of the Head Section

Figure 4:
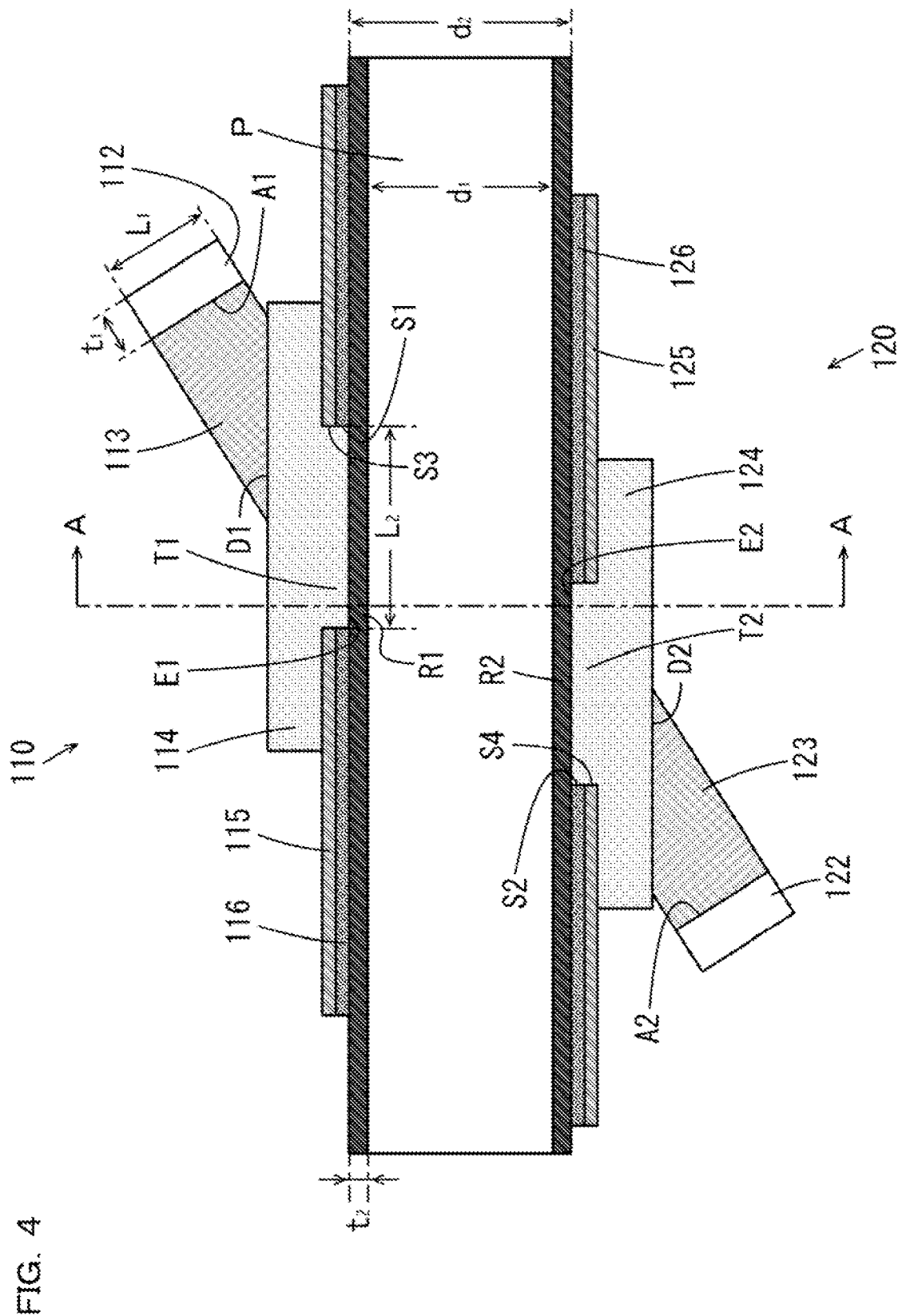
FIG. 4 is a schematic cross sectional view showing details of a sensor head.
Figure 5:
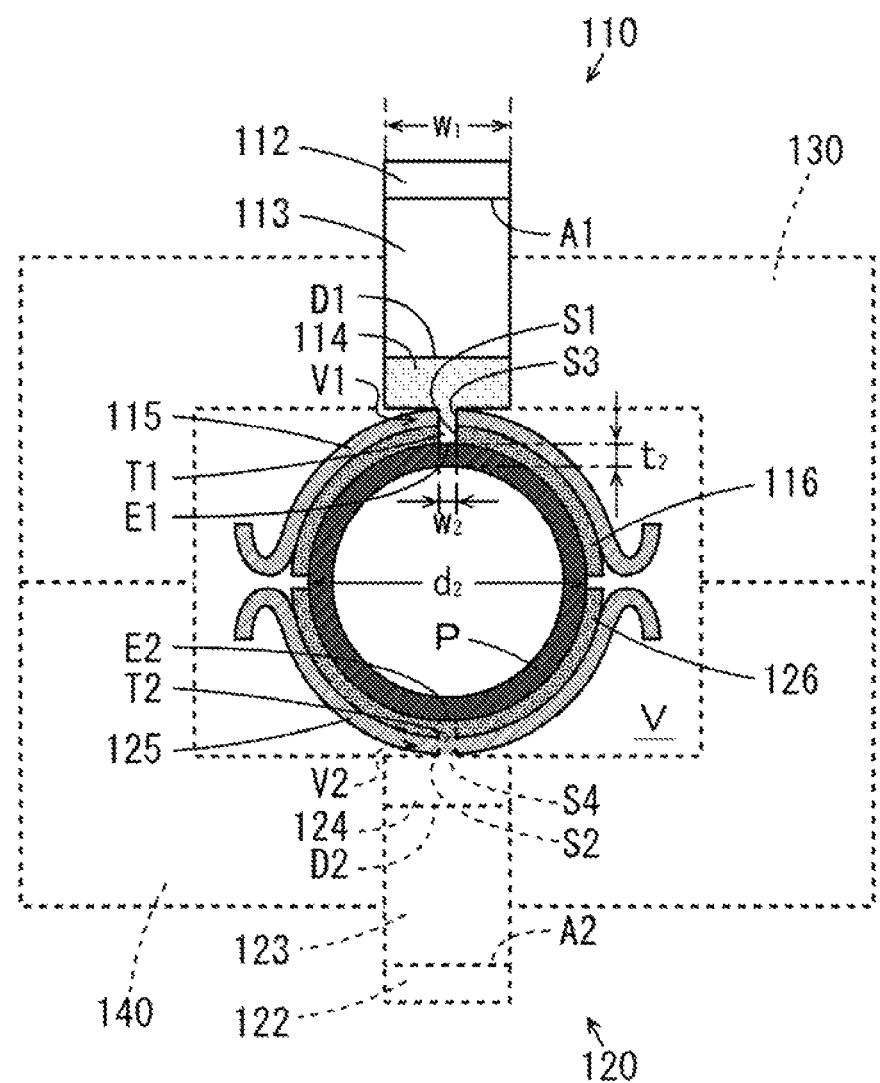
FIG. 5 is an A-A line sectional view of the sensor head shown in FIG. 4.

FIG. 4 is a schematic cross sectional view showing details of the sensor heads 110 and 120. FIG. 5 is an A-A line sectional view of the sensor heads 110 and 120 shown in FIG. 4. In FIG. 4, illustration of the casings 111 and 121, the display lamp 117, the clamp members 130 and 140, and the attachment sheet metals 150 and 160 is omitted. In FIG. 5, illustration of the casings 111 and 121, the display lamp 117, and the attachment sheet metals 150 and 160 is omitted. The sensor head 120 and the clamp members 130 and 140 are indicated by dotted lines.

The ultrasonic element 112 is formed by a thin plate-like piezoelectric element. The thickness of the ultrasonic element 112 is $t_1$ (FIG. 4). The width of the ultrasonic element 112 (the transmission/reception surface A1) is $w_1$ (FIG. 5). The thickness and the width respectively mean sizes in the inclining direction and the width direction. The size (the length) of the transmission/reception surface A1 in the length direction is $L_1$ (FIG. 4). The length $L_1$ may be substantially equal to the width $w_1$ or may be larger than the width $w_1$. In FIG. 4, the thickness of the ultrasonic element 112 is illustrated larger than actual thickness. The outer diameter of the pipe P is $d_2$. The thickness of the peripheral wall is $t_2$.

An AC voltage (a pulse voltage) near an eigenfrequency is applied to the ultrasonic element 112. Consequently, the ultrasonic element 112 vibrates at the eigenfrequency (a resonant frequency $f_r$) and transmits an ultrasonic wave having high intensity. In the following explanation, a product of the resonant frequency $f_r$ of the ultrasonic wave indicated in a unit of MHz (megahertz) and the thickness $t_2$ of the peripheral wall indicated in a unit of mm (millimeter) is referred to as f·t product.

The ultrasonic element 112 is desirably formed to vibrate at the resonant frequency $f_r$, the f·t product of which is 2 or more and 6 or less. By setting the f·t product to 2 or more, fluctuation in phase velocity of the guide wave in the peripheral wall is prevented. Consequently, it is possible to more accurately calculate a flow rate of the fluid. By setting the f·t product to 6 or less, the surface wave of the guide wave in the peripheral wall is prevented from becoming predominant. Consequently, it is possible to generate an ultrasonic wave having high intensity in the fluid.

The ultrasonic element 112 is desirably formed such that the width $w_1$ is five times or more of the thickness $t_1$. In this case, intensity of multiple resonance in the width direction with respect to resonance in the inclining direction, which is a transmitting direction of the ultrasonic wave, decreases. Consequently, a resonant characteristic in the inclining direction can be improved. A desirable configuration of the ultrasonic element 122 is the same as the desirable configuration of the ultrasonic element 112.

The width of a portion on which the ultrasonic wave is irradiated in the peripheral wall of the pipe P (hereinafter referred to as irradiation width) is desirably one third or less of the outer diameter $d_2$ of the pipe P. In this case, it is possible to further reduce the component of the ultrasonic wave propagated in the peripheral wall without passing through the fluid and transmitted and received between the sensor heads 110 and 120. Consequently, it is possible to more accurately calculate a flow rate of the fluid.

As explained above, the width $w_1$ of the ultrasonic element 112 is desirably five times or more of the thickness $t_1$. In order to prevent the ultrasonic element 112 from being broken, it is necessary to set the thickness $t_1$ of the ultrasonic element 112 to a predetermined thickness or more. Therefore, the width $w_1$ of the ultrasonic element 112 (the transmission/reception surface A1) is larger than a predetermined width.

On the other hand, as explained above, the irradiation width of the ultrasonic wave is desirably one third or less of the outer diameter $d_2$ of the pipe P. In this embodiment, since the outer diameter $d_2$ of the pipe P is relatively small (e.g., 2 mm or more and 20 mm or less), the irradiation width of the ultrasonic wave is smaller than the predetermined width. In this way, when the ultrasonic wave transmitted from the entire region of the width w1 of the transmission/reception surface A1 is irradiated on the pipe P, both of the two preferred conditions explained above cannot be satisfied.

Therefore, a propagation route for propagating the ultrasonic wave transmitted from the transmission/reception surface A1 of the ultrasonic element 112 to the pipe P is provided in the elastic couplant 114. In the propagation route, a width changing section V1, the width of which changes between the wedge contact surface D1 and the pipe contact surface E1, is formed. In this embodiment, the wedge contact surface D1 of the elastic couplant 114 is formed to have width of $w_1$. On the other hand, the pipe contact section T1 and the pipe contact surface E1 are formed to have width of $w_2$ smaller than $w_1$. Specifically, the width $w_2$ is one third or less of the outer diameter $d_2$ of the pipe P. That is, in the width changing section V1 of the propagation route, the width changes from $w_1$ to $w_2$ between the wedge contact surface D1 and the pipe contact surface E1.

In this configuration, the ultrasonic wave having the large width w1 is made incident on the elastic couplant 114 from the wedge contact surface D1. Thereafter, the ultrasonic wave is propagated in the elastic couplant 114 and emitted from the lower surface (an emitting surface) of the elastic couplant 114. The emitting surface of the ultrasonic wave excluding the pipe contact surface E1 is not in contact with the pipe P. Therefore, the ultrasonic wave emitted from the emitting surface is gradually attenuated and is hardly irradiated on the pipe P. On the other hand, since the pipe contact surface E1 is in contact with the pipe P, the ultrasonic wave emitted from the pipe contact surface E1 is hardly attenuated and is irradiated on the pipe P.

In particular, in this embodiment, the leaf spring 115 formed by the metal member is disposed between the emitting surface of the ultrasonic wave excluding the pipe contact surface E1 and the pipe P. In this case, the ultrasonic wave emitted from the emitting surface is blocked by the leaf spring 115. Consequently, it is possible to surely prevent the ultrasonic wave from being irradiated on the pipe P from the emitting surface excluding the pipe contact surface E1.

In this way, even when the ultrasonic wave is transmitted from the transmission/reception surface A1 of the ultrasonic element 112 having the large width $w_1$, the ultrasonic wave having the small width $w_2$ can be irradiated on the pipe P. Consequently, both of the two preferred conditions can be satisfied. In this embodiment, the width of the width changing section V1 changes from $w_1$ to $w_2$. However, the present invention is not limited to this. The width of the width changing section V1 may change from $w_3$, which is different from $w_1$ and $w_2$, to $w_2$. The width $w_3$ may be larger than $w_1$ or may be smaller than $w_1$.

The ultrasonic element 112 is disposed to transmit the ultrasonic wave in the inclining direction. Therefore, a spreading region of the ultrasonic wave in the axial direction is larger than a spreading region of the ultrasonic wave transmitted in a direction orthogonal to the axial direction by the ultrasonic element 112. Therefore, the pipe contact surface E1 of the pipe contact section T1 of the elastic couplant 114 is desirably formed to have length of $L_2$ larger than $L_1$ in the axial direction. Consequently, it is possible to irradiate the ultrasonic wave on the pipe P from the pipe contact surface E1 over a sufficiently large region in the axial direction.

The configuration of the elastic couplant 124 is the same as the configuration of the elastic couplant 114. Therefore, a width changing section V2 same as the width changing section V1 is formed in a propagation route of the elastic couplant 124. The pipe contact surface E2 of the pipe contact section T2 of the elastic couplant 124 is desirably formed to have length of $L_2$ larger than $L_1$ in the axial direction.

A rectangular slit S3 extending along the axial direction is formed in the leaf spring 115. A rectangular slit S1 extending along the axial direction and overlapping the slit S3 is formed in the damping material 116. The pipe contact section T1 of the elastic couplant 114 is fit in the slit S3 of the leaf spring 115 and the slit S1 of the damping material 116. In this case, the pipe contact section T1 is surrounded in the circumferential direction and the axial direction by the leaf spring 115 and the damping material 116 while being in contact with the pipe P.

The leaf spring 115 surrounds the pipe contact section T1 in a state in which the leaf spring 115 is attached to the clamp member 130 to thereby retain the position and the posture of the elastic couplant 114 with respect to the clamp member 130. Consequently, even when the pipe contact section T1 having the small width $w_2$ is pressed against the pipe P, a change in the width of the pipe contact section T1 is restricted. Therefore, the ultrasonic wave having the small width w2 can be easily irradiated on the pipe P. Bending, meandering, and deformation of the pipe contact section T1 are prevented while the width of the pipe contact section T1 is maintained. Consequently, it is possible to accurately calculate a flow rate of the fluid flowing in the pipe P.

The damping material 116 is attached to the pipe P in a state in which the damping material 116 surrounds the pipe contact section T1 and the excitation region R1 in the circumferential direction and pressed against the pipe P. In this case, vibration of a portion of the pipe P excluding the excitation region R1 is prevented. The ultrasonic wave propagated in the circumferential direction in the peripheral wall is attenuated by the damping material 116. Consequently, it is possible to further reduce the component of the ultrasonic wave propagated in the peripheral wall without passing through the fluid and transmitted and received between the sensor heads 110 and 120.

The damping material 116 is attached to the pipe P in a state in which the damping material 116 surrounds the pipe contact section T1 and the excitation region R1 in the axial direction and pressed against the pipe P. In this case, vibration of the portion of the pipe P excluding the excitation region R1 is prevented. The ultrasonic wave propagated in the axial direction in the peripheral wall of the pipe P is attenuated by the damping material 116. Therefore, the guide wave propagated in the axial direction is prevented from reflecting on the end face of the peripheral wall in the axial direction and returning. Therefore, the returned guide wave does not excite the ultrasonic wave at unnecessary timing. Consequently, it is possible to more accurately calculate a flow rate of the fluid.

The configurations of the leaf spring 125 and the damping material 126 are respectively the same as the configurations of the leaf spring 115 and the damping material 116. Therefore, a slit S4 same as the slit S3 is formed in the leaf spring 125. A slit S2 same as the slit S1 is formed in the damping material 126. The pipe contact section T2 of the elastic couplant 124 is fit in the slit S4 of the leaf spring 125 and the slit S2 of the damping material 126. Consequently, the pipe contact section T2 is surrounded in the circumferential direction and the axial direction by the leaf spring 125 and the damping material 126 while being in contact with the pipe P. The damping material 126 is attached to the pipe P in a state in which the damping material 126 surrounds the excitation region R2 in the circumferential direction and the axial direction and pressed against the pipe P.

Figure 6:
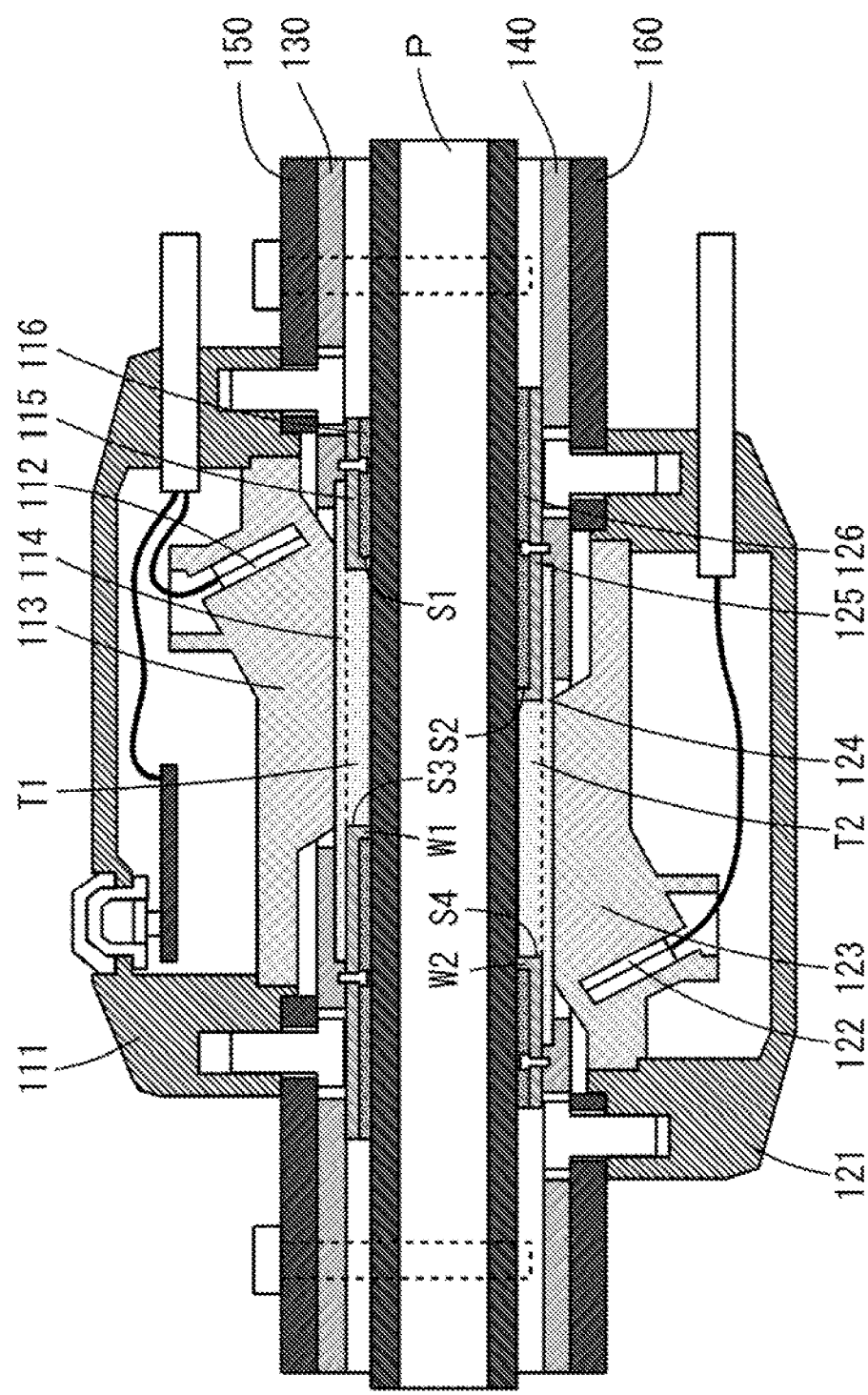
FIG. 6 is a schematic cross sectional view showing an internal configuration of the head section in a modification.

FIG. 6 is a schematic cross sectional view showing an internal configuration of the head section 100 in a modification. As shown in FIG. 6, a standing wall section W1 surrounding the edge of the slit S3 and extending toward the pipe P is formed in the leaf spring 115 in the modification. The standing wall section W1 surrounds the pipe contact section T1 of the elastic couplant 114 while being fit in the slit S1 of the damping material 116. In this case, the leaf spring 115 more firmly retains the position and the posture of the elastic couplant 114 with respect to the clamp member 130. Consequently, bending, meandering, and deformation of the pipe contact section T1 are more surely prevented.

Similarly, a standing wall section W2 surrounding the edge of the slit S4 and extending toward the pipe P is formed in the leaf spring 125 in the modification. The standing wall section W2 surrounds the pipe contact section T2 of the elastic couplant 124 while being fit in the slit S2 of the damping material 126.

(4) Attachment of the Head Section to the Pipe

Figure 7:
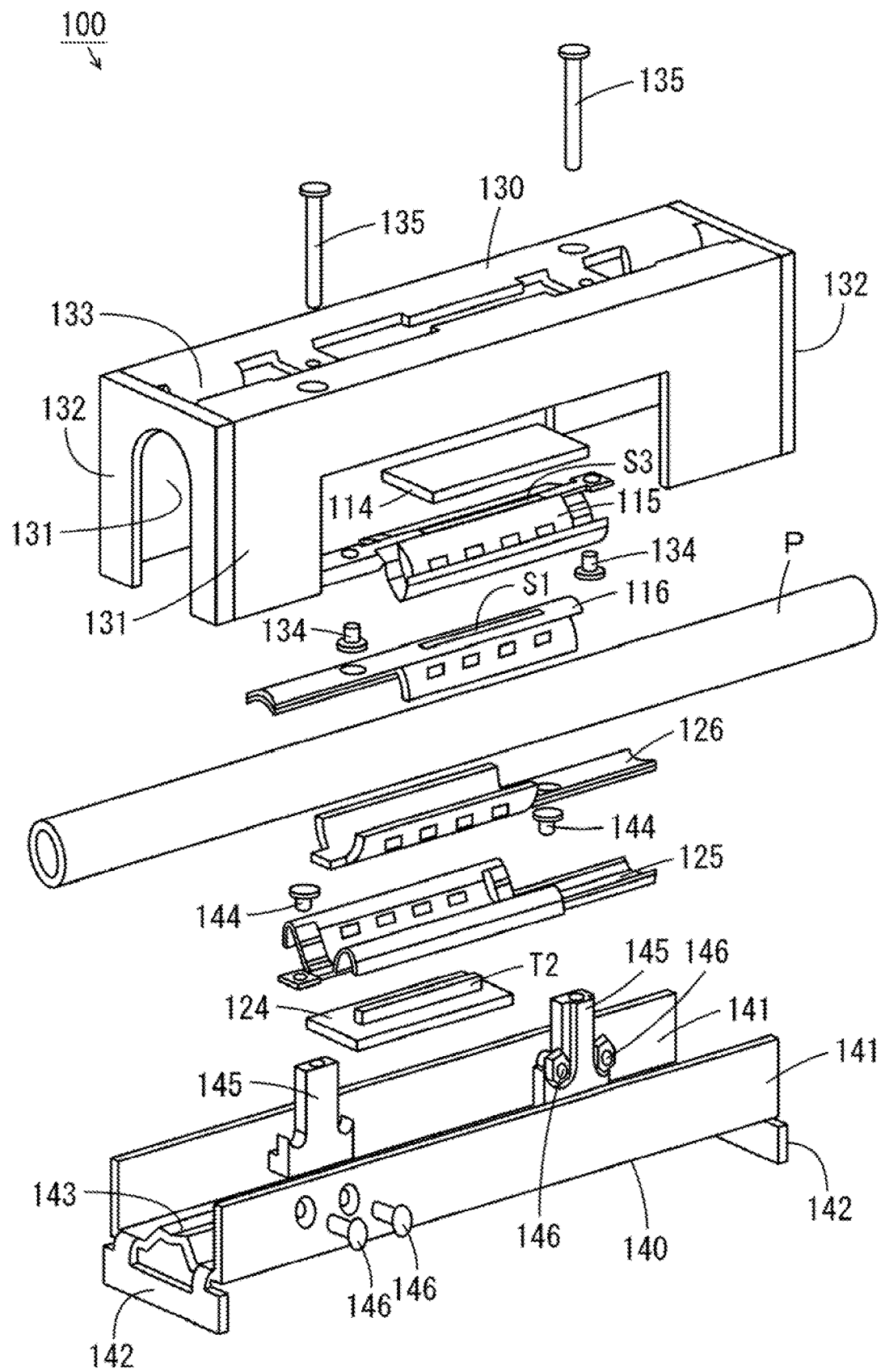
FIG. 7 is a diagram for explaining a process for attaching the head section to a pipe.
Figure 8:
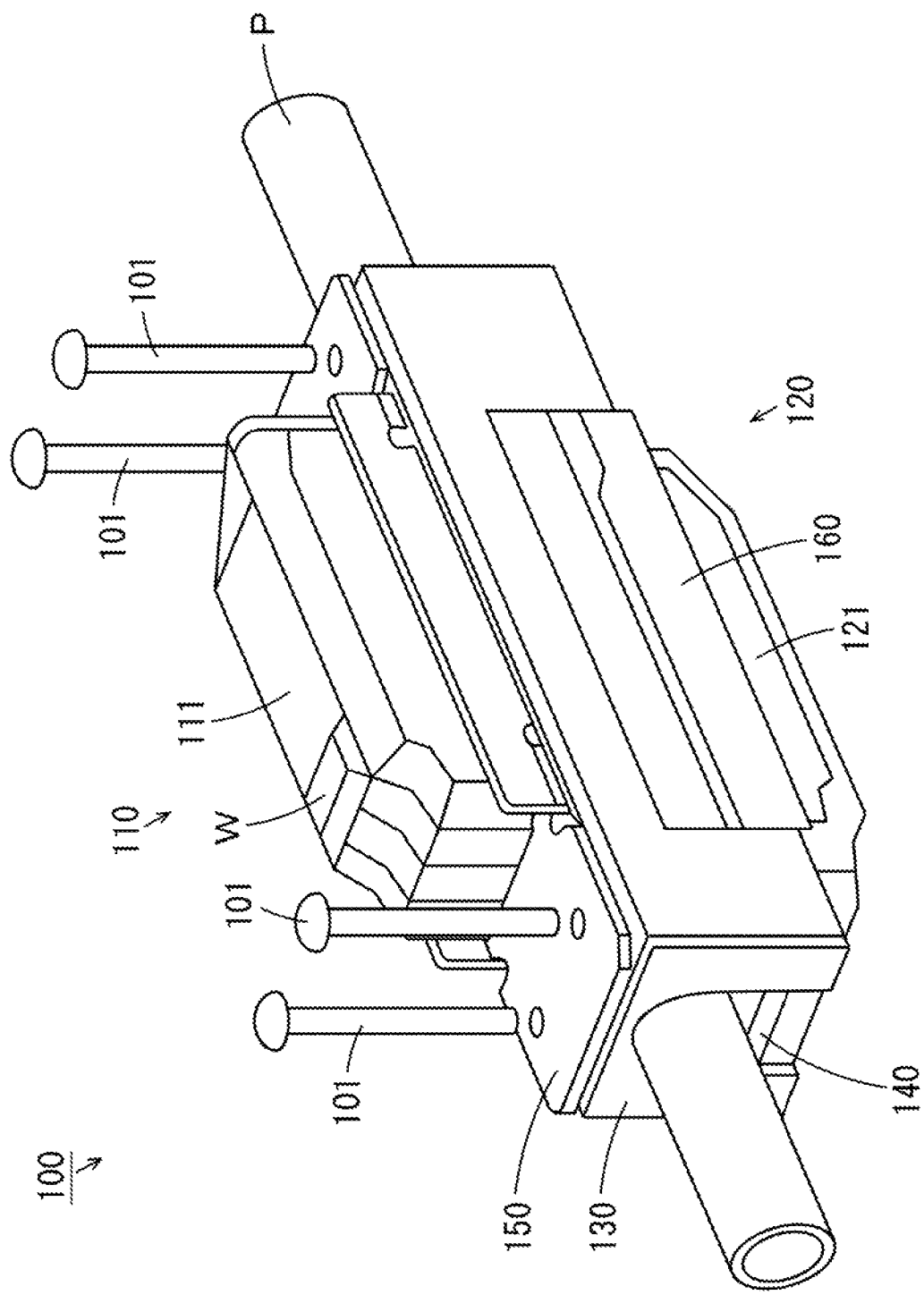
FIG. 8 is a diagram for explaining the process for attaching the head section to the pipe.

FIGS. 7 and 8 are diagrams for explaining a process for attaching the head section 100 to the pipe P. As shown in FIG. 7, the elastic couplant 114 is disposed between the clamp member 130 and the leaf spring 115. Subsequently, in a state in which the pipe contact section T1 (FIGS. 4 and 5) of the elastic couplant 114 is fit in the slit S3 of the leaf spring 115, the leaf spring 115 is attached to the clamp member 130 by the two attachment screws 134. The distal end of the pipe contact section T1 projects from the slit S3 of the leaf spring 115.

Subsequently, the damping material 116 is disposed such that the distal end of the pipe contact section T1 is fit in the slit S1. The damping material 116 may be bonded to the leaf spring 115 by an adhesive or the like. In this case, it is easy to integrally handle the elastic couplant 114, the leaf spring 115, and the damping material 116 together with the clamp member 130.

Similarly, the elastic couplant 124 is disposed between the clamp member 140 and the leaf spring 125. Subsequently, in a state in which the pipe contact section T2 of the elastic couplant 124 is fit in the slit S4 (FIGS. 4 and 5) of the leaf spring 125, the leaf spring 125 is attached to the clamp member 140 by the two attachment screws 144. The distal end of the pipe contact section T2 projects from the slit S4 of the leaf spring 125.

Subsequently, the damping material 126 is disposed to fit the distal end of the pipe contact section T2 in the slit S2 (FIGS. 4 and 5). The damping material 126 may be bonded to the leaf spring 125 by an adhesive or the like. In this case, it is easy to integrally handle the elastic couplant 124, the leaf spring 125, and the damping material 126 together with the clamp member 140.

The clamp member 140 includes a pair of vertical walls 141 extending in the axial direction and facing each other in the width direction and a pair of vertical walls 142 facing each other in the axial direction. The clamp member 140 includes a supporting section 143 formed to be capable of supporting the pipe P by coming into contact with the pipe P. A pair of temporary fixing members 145 for temporarily fixing the clamp member 140 to the pipe P is provided on surfaces (inner surfaces) facing each other of the pair of vertical walls 141. The temporary fixing members 145 are formed by an elastic body such as a rubber member. In this embodiment, the pair of temporary fixing members 145 is disposed to be offset from each other in the axial direction without facing each other in the width direction.

The clamp member 130 includes a pair of vertical walls 131 extending in the axial direction and facing each other in the width direction and a pair of vertical walls 132 facing each other in the axial direction. The pair of vertical walls 131 and the pair of vertical walls 141 correspond to each other. Similarly, the pair of vertical walls 132 and the pair of vertical walls 142 correspond to each other. The clamp member 130 includes a supporting section 133 formed to be capable of supporting the pipe P by coming into contact with the pipe P.

The pair of vertical walls 131 and the pair of vertical walls 132 guide the clamp member 130 when the clamp member 130 is attached to the pipe P. The pair of vertical walls 141 and the pair of vertical walls 142 guide the clamp member 140 when the clamp member 140 is attached to the pipe P. The clamp members 130 and 140 are guided by the pairs of vertical walls 131 and 141 corresponding to each other and the pairs of vertical walls 132 and 142 corresponding to each other.

The inner surfaces of the pair of vertical walls 131 and the outer surfaces of the pair of vertical walls 141 have a dimension relation with which a clearance is formed for enabling the inner surfaces and the outer surfaces to move in parallel to each other when being right opposed to each other and for restricting the inner surfaces and the outer surfaces from tilting a predetermined angle or more around the axial direction of the pipe P. Similarly, the inner surfaces of the pair of vertical walls 132 and the outer surfaces of the pair of vertical walls 142 have a dimension relation with which a clearance is formed for enabling the inner surfaces and the outer surfaces to move in parallel to each other when being right opposed to each other and for restricting the inner surfaces and the outer surfaces from tilting a predetermined angle or more in a pitching direction along the axial direction of the pipe P.

The clamp member 140 is disposed to locate the pipe P between the inner surfaces of the pair of vertical walls 141. In this case, the pair of temporary fixing members 145 is in contact with the pipe P. The clamp member 130 is disposed to locate the pair of vertical walls 141 between the inner surfaces of the pair of vertical walls 131 and locate the pair of vertical walls 142 between the inner surfaces of the pair of vertical walls 132. Thereafter, the clamp member 130 and the clamp member 140 clamp the pipe P with a predetermined pressing force or more. In this state, a pair of temporary fixing screws 135 is respectively screwed in the pair of temporary fixing members 145 of the clamp member 140 to pierce through the clamp member 130 in the up-down direction.

According to the procedure explained above, the clamp members 130 and 140 are temporarily fixed to the pipe P together with the elastic couplants 114 and 124, the leaf springs 115 and 125, and the damping materials 116 and 126. In this case, a state in which the clamp member 130 and the clamp member 140 are pressed is maintained by the pair of temporary fixing members 145 and the pair of temporary fixing screws 135. Consequently, the clamp members 130 and 140 are prevented from coming off the pipe P. The clamp members 130 and 140 are prevented from slipping in the axial direction by a frictional force generated between the clamp members 130 and 140 and the pipe P.

Screw holes having a diameter slightly smaller than the diameter of screw sections of the temporary fixing screws 135 corresponding to the screw holes are formed in the temporary fixing members 145. When the clamp members 130 and 140 clamp the pipe P with the predetermined pressing force or more, the temporary fixing screws 135 are inserted into the temporary fixing members 145 while expanding the screw holes of the temporary fixing members 145 corresponding to the temporary fixing screws 135. In this case, the temporary fixing screws 135 are prevented from easily coming off the temporary fixing members 145 by a frictional force generated between the temporary fixing screws 135 and the temporary fixing members 145. Consequently, it is possible to maintain a state in which the clamp members 130 and 140 clamp the pipe P with the predetermined pressing force or more.

The length of the screw sections of the temporary fixing screws 135 inserted into the screw holes of the temporary fixing members 145 is different depending on the outer diameter of the pipe P. Specifically, inserting portions of the temporary fixing screws 135 are short when the outer diameter of the pipe P is large. The inserting portions of the temporary fixing screws 135 are long when the outer diameter of the pipe P is small. Therefore, the screw holes of the temporary fixing members 145 are formed in length with which a sufficient frictional force can be generated even when the inserting portions of the temporary fixing screws 135 are the shortest and the distal ends of the temporary fixing screws 135 do not come into contact with the bottoms of the screw holes of the temporary fixing members 145 even when the inserting portions of the temporary fixing screws 135 are the longest. Consequently, it is possible to temporarily fix the clamp members 130 and 140 to the pipe P having various outer diameters.

Thereafter, the attachment sheet metals 150 and 160 are disposed to sandwich the clamp members 130 and 140 temporarily fixed to the pipe P. As shown in FIG. 2, the casing 111 is attached to the attachment sheet metal 150 by the two attachment screws 151. The casing 121 is attached to the attachment sheet metal 160 by the two attachment screws 161.

In this state, the attachment sheet metal 150 and the attachment sheet metal 160 are coupled to each other by four coupling screws 101 to sandwich the pipe P such that the attachment sheet metal 150 is attached to the clamp member 130 and the attachment sheet metal 160 is attached to the clamp member 140. Consequently, the sensor head 110 is attached to the pipe P by the clamp member 130 while the pipe P is supported by the supporting section 133 of the clamp member 130. The sensor head 120 is attached to the clamp member 140 while the pipe P is supported by the supporting section 143 of the clamp member 140.

In a state in which the sensor head 110 is attached to the pipe P, the elastic couplant 114 and the damping material 116 are pressed against the pipe P by the clamp member 130. The pipe contact section T1 of the elastic couplant 114 is disposed along the axial direction while being in contact with the pipe P. The supporting section 133 of the clamp member 130 comes into contact with the pipe P, whereby a crushing amount of the elastic couplant 114 (the pipe contact section T1) is restricted. Therefore, the elastic couplant 114 can be uniformly pressed irrespective of an individual difference of an operator who attaches the clamp member 130.

Similarly, in a state in which the sensor head 120 is attached to the pipe P, the elastic couplant 124 and the damping material 126 are pressed against the pipe P by the clamp member 140. The pipe contact section T2 of the elastic couplant 124 is disposed along the axial direction while being in contact with the pipe P. The supporting section 143 of the clamp member 140 comes into contact with the pipe P, whereby a crushing amount of the elastic couplant 124 (the pipe contact section T2) is restricted. Therefore, the elastic couplant 124 can be uniformly pressed irrespective of an individual difference of an operator who attaches the clamp member 140.

Figure 9:
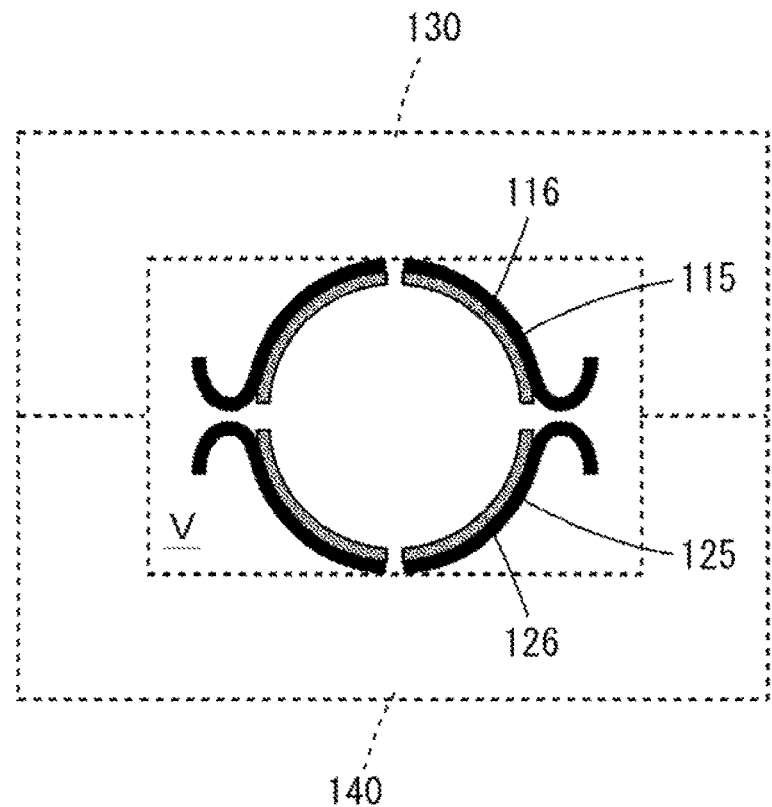
FIG. 9 is a schematic sectional view showing the inside of a clamp member in a state in which the pipe is not attached.
Figure 10:
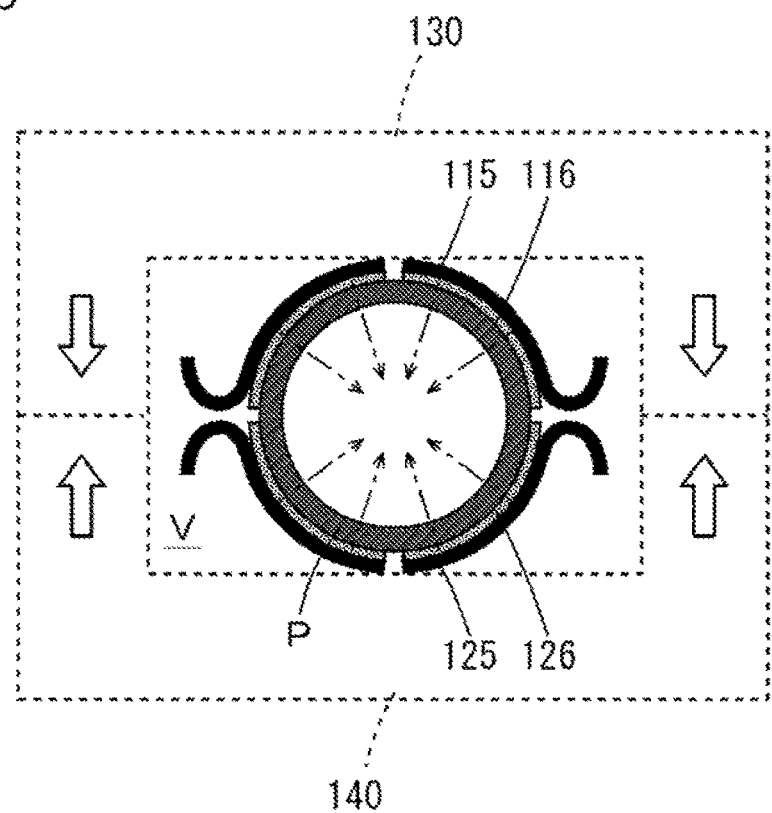
FIG. 10 is a schematic sectional view showing the inside of the clamp member in a state in which the pipe is attached.
Figure 11:
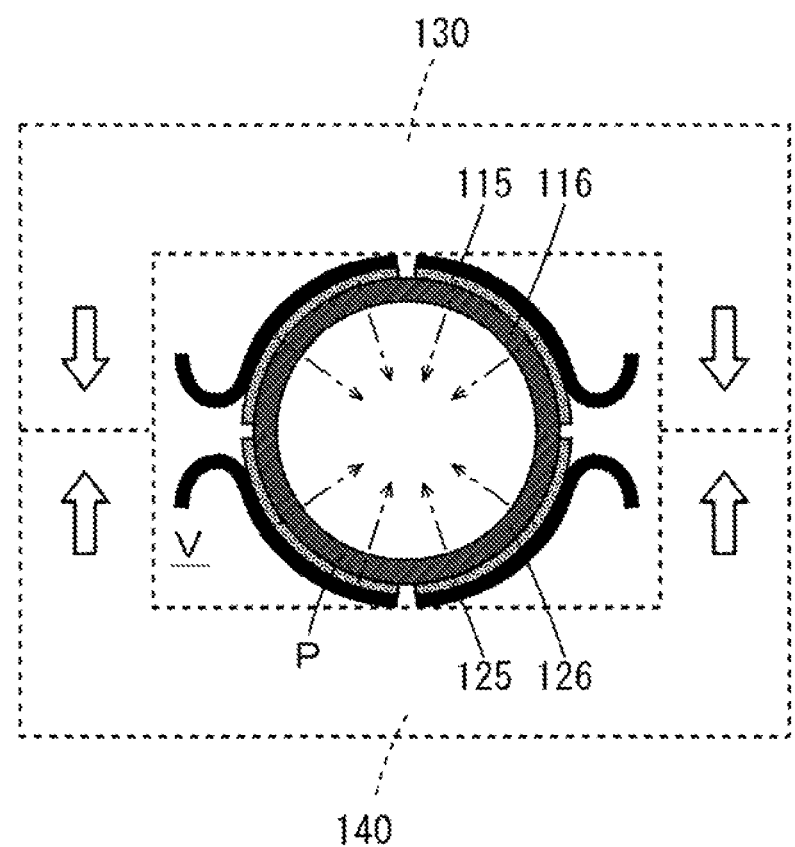
FIG. 11 is a schematic sectional view showing the inside of the clamp member in the state in which the pipe is attached.

FIG. 9 is a schematic sectional view showing the insides of the clamp members 130 and 140 in a state in which the pipe P is not attached. FIGS. 10 and 11 are schematic sectional views showing the insides of the clamp members 130 and 140 in a state in which the pipe P is attached. The outer diameter of the pipe P shown in FIG. 11 is slightly larger than the outer diameter of the pipe P shown in FIG. 10.

In this embodiment, the leaf springs 115 and 125 and the damping materials 116 and 126 have high elasticity. The leaf springs 115 and 125 are springs of semi-cylindrical thin plates and are thin leaf springs, both ends in the circumferential direction of which are arcuate cantilevers with respect to fixed parts attached to the clamp members 130 and 140 by the two attachment screws 134 and 144. As shown in FIGS. 9 to 11, a space V for allowing deformation of the leaf springs 115 and 125 and the damping materials 116 and 126 is secured on the insides of the clamp members 130 and 140. Further, as shown in FIG. 9, in a state in which the pipe P is not attached to the leaf springs 115 and 125, the diameter of the inner surfaces of the damping materials 116 and 126 is set slightly smaller than the outer diameter of the pipe P that can be attached.

As shown in FIG. 10, the clamp members 130 and 140 clamp the pipe P. The pipe P is attached to the leaf springs 115 and 125. At this time, as indicated by white arrows, forces facing each other are generated in the leaf springs 115 and 125 and forces facing each other are generated in the damping materials 116 and 126, whereby the leaf springs 115 and 125 and the damping materials 116 and 126 are expanded in the space V. In this case, as indicated by arrows of alternate long and short dash lines, a pressing force is generated also in a direction (a direction toward the axis center of the pipe P) different from the clamping direction of the clamp members 130 and 140 by the elasticity of the thin leaf springs of the respective arcuate cantilevers of the leaf springs 115 and 125 that resist the expansion. Consequently, simply by clamping the pipe P with the clamp members 130 and 140, the damping materials 116 and 126 are pressed against the pipe P toward the axis center of the pipe P by the leaf springs 115 and 125 which are the springs of the semi-cylindrical thin plates. As a result, it is possible to surely attenuate an unnecessary component of the ultrasonic wave propagated in the peripheral wall of the pipe P.

As shown in FIG. 11, even when the outer diameter of the pipe P is slightly different, when the clamp members 130 and 140 clamp the pipe P, as shown in FIG. 10, the pressing force is generated in the direction toward the axis center of the pipe P by the elasticity of the leaf springs 115 and 125. Consequently, the damping materials 116 and 126 are pressed against the pipe P toward the axis center of the pipe P.

The space V is secured on the insides of the clamp members 130 and 140 in this way, whereby, even when there is an error or fluctuation in the outer diameter of the pipe P, the leaf springs 115 and 125 are allowed to be deformed. Consequently, the clamp members 130 and 140 can be easily attached to the pipe P. The damping material 116 is deformed, whereby the damping material 116 can be surely pressed against the pipe P by the clamp member 130.

Similarly, the damping material 126 is deformed, whereby the damping material 126 can be surely pressed against the pipe P by the clamp member 140.

(5) The Relay Section and the Main Body Section

Figure 12:
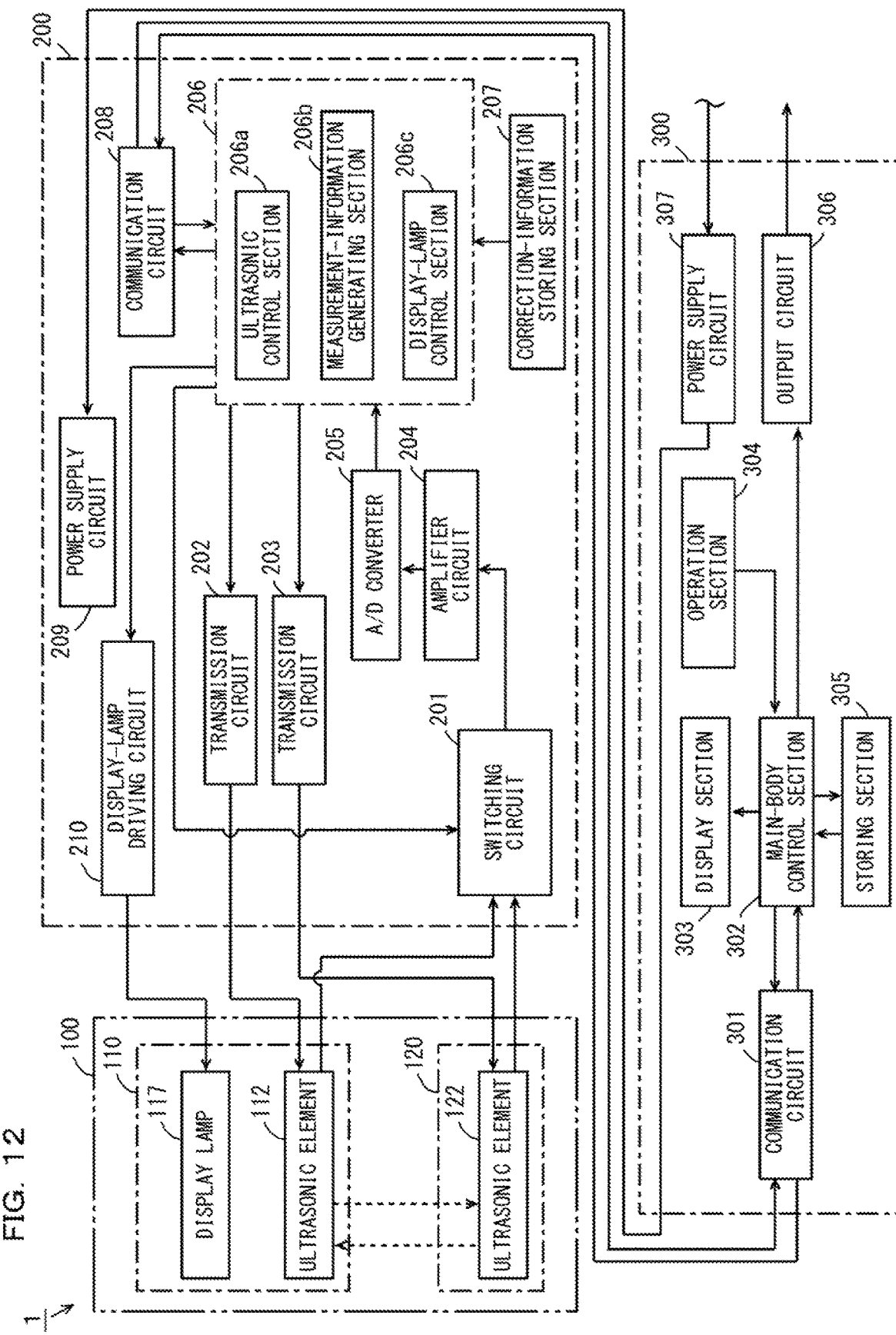
FIG. 12 is a block diagram showing internal configurations of a relay section and a main body section shown in FIG. 1.

FIG. 12 is a block diagram showing internal configurations of the relay section 200 and the main body section 300 shown in FIG. 1. As shown in FIG. 12, the relay section 200 includes a switching circuit 201, transmission circuits 202 and 203, an amplifier circuit 204, an A/D (analog/digital) converter 205, a relay control section 206, a correction-information storing section 207, a communication circuit 208, a power supply circuit 209, and a display-lamp driving circuit 210.

The switching circuit 201 is connected to the ultrasonic element 112 via the head cable CA1 shown in FIG. 1 and connected to the ultrasonic element 122 via the head cable CA2 shown in FIG. 1. In the relay section 200, the switching circuit 201 is connected to the amplifier circuit 204. The switching circuit 201 switches a connection state of the ultrasonic elements 112 and 122 and the amplifier circuit 204 between a first state and a second state on the basis of control by the relay control section 206.

The first state is a state in which the ultrasonic element 122 and the amplifier circuit 204 are connected and the ultrasonic element 112 and the amplifier circuit 204 are not connected. In the first state, the ultrasonic element 122 receives an ultrasonic wave and outputs an ultrasonic signal of an analog format corresponding to the received ultrasonic wave. The ultrasonic signal output from the ultrasonic element 122 is given to the amplifier circuit 204.

The second state is a state in which the ultrasonic element 112 and the amplifier circuit 204 are connected and the ultrasonic element 122 and the amplifier circuit 204 are not connected. In the second state, the ultrasonic element 112 receives an ultrasonic wave and outputs an ultrasonic signal of an analog format corresponding to the received ultrasonic wave. The ultrasonic signal output from the ultrasonic element 112 is given to the amplifier circuit 204.

The transmission circuit 202 includes a tristate driver. In the transmission circuit 202, an output state of the tristate driver is switched among three states (an H level state, an L level state, and a high impedance state) on the basis of the control by the relay control section 206, whereby a first driving signal is generated. The ultrasonic element 112 transmits an ultrasonic wave in response to the first driving signal generated by the transmission circuit 202.

Similarly, the transmission circuit 203 includes a tristate driver. In the transmission circuit 203, an output state of the tristate driver is switched among the three states on the basis of the control by the relay control section 206, whereby a second driving signal is generated. The ultrasonic element 122 transmits an ultrasonic wave in response to the second driving signal generated by the transmission circuit 203.

The amplifier circuit 204 amplifies, with a predetermined gain, the ultrasonic signal given from the ultrasonic element 112 or the ultrasonic element 122 and gives the ultrasonic signal after the amplification to the A/D converter 205. The A/D converter 205 performs A/D conversion of the given ultrasonic signal and gives an ultrasonic signal of a digital format after the conversion to the relay control section 206.

The relay control section 206 is configured by, for example, an FPGA (Field-Programmable Gate Array) or a CPU (Central Processing Unit) and a memory. The relay control section 206 includes an ultrasonic control section 206*a*, a measurement-information generating section 206*b*, and a display-lamp control section 206*c* as functional sections. When the relay control section 206 is configured by the CPU and the memory, these functional sections are realized by the CPU executing a computer program stored in the memory. A part of the ultrasonic control section 206*a*, the measurement-information generating section 206*b*, and the display-lamp control section 206*c* may be realized by an electronic circuit (hardware) such as an FPGA. The remaining part may be realized by the CPU executing the computer program.

The ultrasonic control section 206*a* controls the switching circuit 201 and the transmission circuits 202 and 203 on the basis of control by the main body section 300. For example, the ultrasonic control section 206*a* shifts the connection state between the ultrasonic elements 112 and 122 and the amplifier circuit 204 to the first state and operates the transmission circuit 202 to generate the first driving signal. In this case, an ultrasonic wave is transmitted by the ultrasonic element 112 and received by the ultrasonic element 122. An ultrasonic signal output from the ultrasonic element 122 is amplified by the amplifier circuit 204, A/D-converted by the A/D converter 205, and thereafter given to the measurement-information generating section 206*b*.

The ultrasonic control section 206*a* shifts the connection state between the ultrasonic elements 112 and 122 and the amplifier circuit 204 to the second state and operates the transmission circuit 203 to generate the second driving signal. In this case, an ultrasonic wave is transmitted by the ultrasonic element 122 and received by the ultrasonic element 112. An ultrasonic signal output from the ultrasonic element 112 is amplified by the amplifier circuit 204, A/D-converted by the A/D converter 205, and thereafter given to the measurement-information generating section 206*b*.

The measurement-information generating section 206*b* generates a time difference as measurement information from a peak of a cross-correlation function of signal waveforms of the two ultrasonic signals output from the ultrasonic elements 112 and 122. The measurement-information generating section 206*b* may measure a propagation time of the ultrasonic wave from the ultrasonic element 112 to the ultrasonic element 122 and a propagation time of the ultrasonic wave from the ultrasonic element 122 to the ultrasonic element 112 and calculate a difference between the times as a time difference.

The display-lamp control section 206*c* controls the display-lamp driving circuit 210 on the basis of the control by the main body section 300. The display-lamp driving circuit 210 is connected to the display lamp 117 via the head cable CA1 shown in FIG. 1. The display-lamp driving circuit 210 generates a third driving signal for driving the display lamp 117 on the basis of the control by the display-lamp control section 206*c*.

The correction-information storing section 207 is configured by, for example, a nonvolatile memory. The correction-information storing section 207 stores correction information concerning the ultrasonic elements 112 and 122, the switching circuit 201, the transmission circuits 202 and 203, the amplifier circuit 204, and the A/D converter 205.

Depending on operation characteristics of the components of the head section 100 and the relay section 200, the relation of Expression (1) is not satisfied between the time difference calculated by the measurement-information generating section 206*b* and the flow rate of the fluid flowing in the pipe P. The correction information is information for correcting Expression(1) in order to accurately calculate a peculiar relation between the time difference calculated by the measurement-information generating section 206b and a flow rate that should be actually measured. The correction information includes, for example, a value for adjusting a coefficient of the time difference Δt in Expression (1) and an offset value (an adjustment value with respect to a flow rate 0) that should be added to a term including the time difference Δt in Expression (1).

The communication circuit 208 is connected to one end of the relay cable CA3 shown in FIG. 1. The communication circuit 208 outputs measurement information of a digital format generated by the measurement-information generating section 206b and the correction information to the main body section 300 through the relay cable CA3. The communication circuit 208 gives a transmission control signal and a display control signal input from the main body section 300 through the relay cable CA3 to the relay control section 206. The transmission control signal is a control signal for controlling the transmission circuits 202 and 203. The display control signal is a control signal for controlling the display-lamp driving circuit 210.

The power supply circuit 209 receives electric power supplied from the main body section 300 through the relay cable CA3 and supplies the received electric power to the other components provided in the relay section 200.

The main body section 300 includes a communication circuit 301, a main-body control section 302, a display section 303, an operation section 304, a storing section 305, an output circuit 306, and a power supply circuit 307. The communication circuit 301 is connected to the other end of the relay cable CA3 shown in FIG. 1. The communication circuit 301 gives the measurement information and the correction information output from the relay section 200 through the relay cable CA3 to the main-body control section 302. The communication circuit 301 outputs a transmission control signal and a display control signal generated in the main-body control section 302 as explained below to the relay section 200 through the relay cable CA3.

The display section 303 includes, for example, a segment display or a dot matrix display and displays, for example, a flow rate of the fluid flowing in the pipe P on the basis of the control by the main-body control section 302. The operation section 304 includes a plurality of operation buttons. The user can input the dimension of the pipe P, to which the head section 100 is attached, a flow rate correction coefficient, and the like by operating the operation section 304. The user can input a threshold of a flow rate by operating the operation section 304. The storing section 305 is configured by a nonvolatile memory or a hard disk drive.

The main-body control section 302 includes, for example, a CPU and a memory and generates a transmission control signal and a display control signal that should be given to the relay section 200 in order to respectively drive the ultrasonic elements 112 and 122 and the display lamp 117. The main-body control section 302 causes the storing section 305 to store information such as the dimension of the pipe P, the flow rate correction coefficient, and the threshold of the flow rate input by the operation section 304 to thereby set the information. As the dimension of the pipe P, the outer diameter $d_2$ of the pipe P and the thickness $t_2$ of the peripheral wall are input to the operation section 304, whereby the inner diameter $d_1$ of the pipe P may be set.

Further, the main-body control section 302 corrects Expression (1) on the basis of the correction information given from the communication circuit 301. The main-body control section 302 calculates a flow rate of the fluid flowing in the pipe P on the basis of the measurement information given from the communication circuit 301 and the set flow rate correction coefficient. The main-body control section 302 generates an ON/OFF signal on the basis of a comparison result of the calculated flow rate and the set threshold of the flow rate. The output circuit 306 is connected to one end of the main body cable CA4 shown in FIG. 1. The output circuit 306 outputs the ON/OFF signal generated by the main-body control section 302 to the external apparatus of the flow sensor 1 through the main body cable CA4.

(6) Effects

In the flow sensor 1 according to this embodiment, the ultrasonic wave emitted from the ultrasonic element 112 is propagated by the wedge material 113 and emitted from the incident/emitting surface C1 inclining with respect to the propagating direction of the ultrasonic wave. The elastic couplant 114 is supported on the pipe P by the clamp member 130 such that the pipe contact section T1 is in contact with the pipe P and disposed along the axial direction. The elastic couplant 114 propagates the ultrasonic wave emitted from the incident/emitting surface C1 of the wedge material 113 to the pipe P via the pipe contact section T1. The damping material 116 is disposed to attenuate the ultrasonic wave and surround the pipe contact section T1 of the elastic couplant 114 between the clamp member 130 and the pipe P.

The ultrasonic wave emitted from the ultrasonic element 122 is propagated by the wedge material 123 and emitted from the incident/emitting surface C2 inclining with respect to the propagating direction of the ultrasonic wave. The elastic couplant 124 is supported on the pipe P by the clamp member 140 such that the pipe contact section T2 is in contact with the pipe P and disposed along the axial direction. The elastic couplant 124 propagates the ultrasonic wave emitted from the incident/emitting surface C2 of the wedge material 123 to the pipe P via the pipe contact section T2. The damping material 126 is disposed to attenuate the ultrasonic wave and surround the pipe contact section T2 of the elastic couplant 124 between the clamp member 140 and the pipe P.

In the state in which the damping material 116 is pressed by the clamp member 130 and the damping material 126 is pressed by the clamp member 140, the clamp member 130 and the clamp member 140 are coupled to each other to sandwich the pipe P. The ultrasonic wave is transmitted and received between the ultrasonic element 112 and the ultrasonic element 122 across the pipe P.

With this configuration, a Lamb wave is excited in the peripheral wall of the pipe P by vibration. The ultrasonic wave can be transmitted and received between the ultrasonic element 112 and the ultrasonic element 122 across the pipe P using the excited Lamb wave. In this case, the unnecessary component of the ultrasonic wave propagated in the peripheral wall of the pipe P without passing through the fluid and transmitted and received between the ultrasonic element 112 and the ultrasonic element 122 decreases. Therefore, it is easy to calculate a flow rate of the fluid flowing in the pipe P on the basis of the ultrasonic wave transmitted and received between the ultrasonic element 112 and the ultrasonic element 122.

The damping material 116 is pressed against the pipe P in the state in which the damping material 116 surrounds the pipe contact section T1. The damping material 126 is pressed against the pipe P in the state in which the damping material 126 surrounds the pipe contact section T2. Therefore, the vibration of the portion of the pipe P excluding the contact portion of the pipe contact sections T1 and T2 is prevented. The component of the ultrasonic wave propagated in the circumferential direction in the peripheral wall of the pipe P is attenuated by the damping materials 116 and 126. Consequently, the unnecessary component of the ultrasonic wave propagated in the peripheral wall of the pipe P without passing through the fluid and transmitted and received between the ultrasonic element 112 and the ultrasonic element 122 further decreases.

The ultrasonic wave propagated in the axial direction in the peripheral wall of the pipe P is prevented from reflecting on the end face of the peripheral wall in the axial direction and returning by the damping materials 116 and 126. Therefore, the returned ultrasonic wave does not excite the ultrasonic wave at unnecessary timing. As a result, it is possible to calculate a flow rate of the fluid flowing in the metal pipe P having the small diameter.

(7) Other Embodiments (a) In the embodiment, the relay section 200 and the main body section 300 are provided as the separate bodies and connected by the relay cable CA3. However, the present invention is not limited to this. The relay section 200 and the main body section 300 may be integrally provided.

(b) In the embodiment, the damping material 116 is configured by one elastic body surrounding the pipe contact section T1 of the elastic couplant 114 in the circumferential direction and the axial direction. However, the present invention is not limited to this. The damping material 116 may be configured by a plurality of elastic bodies surrounding the pipe contact section T1 of the elastic couplant 114 in the circumferential direction and the axial direction. In this case, the slit S1 may not be formed in the damping material 116. Similarly, the damping material 126 may be configured by a plurality of elastic bodies surrounding the pipe contact section T2 of the elastic couplant 124 in the circumferential direction and the axial direction.

(c) In the embodiment, the leaf springs 115 and 125 are provided in the head section 100. However, the present invention is not limited to this. The leaf spring 115 may not be provided in the head section 100. In this case, the damping material 116 may be attached to the clamp member 130 by an adhesive or the like. The pipe contact section T1 of the elastic couplant 114 is fit in the slit S1 of the damping material 116. Consequently, the damping material 116 retains the position and the posture of the elastic couplant 114 with respect to the clamp member 130.

Similarly, the leaf spring 125 may not be provided in the head section 100. In this case, the damping material 126 may be attached to the clamp member 140 by an adhesive or the like. The pipe contact section T2 of the elastic couplant 124 is fit in the slit S2 of the damping material 126. Consequently, the damping material 126 retains the position and the posture of the elastic couplant 124 with respect to the clamp member 140.

(8) Correspondence Relation Between the Constituent Elements of the Claims and the Sections of the Embodiment An example of correspondence between the constituent elements of the claims and the sections of the embodiment is explained below. However, the present invention is not limited to the example. As the constituent elements of the claims, other various elements having the configurations or the functions described in the claims can also be used.

In the embodiment, the pipe P is an example of the pipe. The flow sensor 1 is an example of the clamp-on type ultrasonic flow sensor. The ultrasonic elements 112 and 122 are respectively examples of the first and second ultrasonic elements. The incident/emitting surfaces C1 and C2 are respectively examples of the first and second incident/emitting surfaces. The wedge materials 113 and 123 are respectively examples of the first and second wedge materials. The pipe contact sections T1 and T2 are respectively examples of the first and second pipe contact sections.

The elastic couplants 114 and 124 are respectively examples of the first and second elastic couplants. The clamp members 130 and 140 are respectively examples of the first and second clamp members. The damping materials 116 and 126 are respectively examples of the first and second damping materials. The main-body control section 302 is an example of the flow-rate calculating section. The slits S1 to S4 are respectively examples of the first to fourth slits. The space V is an example of the space. The leaf springs 115 and 125 are respectively examples of the first and second pressing members. The vertical walls 131, 132, 141, and 142 are examples of the guide wall. The excitation regions R1 and R2 are respectively examples of the first and second excitation regions.

What is claimed is:
1. A clamp-on type ultrasonic flow sensor that measures a flow rate of fluid flowing in a pipe, the clamp-on type ultrasonic flow sensor comprising:
 a first ultrasonic element configured to transmit and receive an ultrasonic wave;
 a first wedge coupled to the first ultrasonic element, configured to propagate the ultrasonic wave transmitted from the first ultrasonic element and including a first incident/emitting surface that inclines with respect to a propagating direction of the ultrasonic wave and emits the propagated ultrasonic wave;
 a first elastic couplant coupled to the first incident/emitting surface of the first wedge, including a first pipe contact section in contact with the pipe and configured to propagate the ultrasonic wave emitted from the first incident/emitting surface of the first wedge to the pipe via the first pipe contact section;
 a first clamp member supporting the pipe and the first elastic couplant to dispose the first pipe contact section on the pipe along an axial direction of the pipe;
 a first damping material, attenuating the ultrasonic wave, disposed surround the first pipe contact section of the first elastic couplant between the first clamp member and the pipe;
 a second ultrasonic element configured to transmit and receive the ultrasonic wave between the second ultrasonic element and the first ultrasonic element across the pipe;
 a second wedge coupled to the second ultrasonic element configured to propagate an ultrasonic wave transmitted from the second ultrasonic element and including a second incident/emitting surface that inclines with respect to a propagating direction of the ultrasonic wave and emits the propagated ultrasonic wave;
 a second elastic couplant coupled to the second incident/emitting surface of the second wedge, including a second pipe contact section in contact with the pipe and configured to propagate the ultrasonic wave emitted from the second incident/emitting surface of the second wedge to the pipe via the second pipe contact section;

a second clamp member supporting the pipe and the second elastic couplant to dispose the second pipe contact section on the pipe along the axial direction;

a second damping material, attenuating the ultrasonic wave, disposed surround the second pipe contact section of the second elastic couplant between the second clamp member and the pipe; and a flow-rate calculating section configured to calculate a flow rate of the fluid flowing in the pipe on the basis of the ultrasonic wave transmitted and received between the first ultrasonic element and the second ultrasonic element, wherein the first clamp member and the second clamp member are coupled to each other to sandwich the pipe in a state in which the first clamp member presses the first damping material and the second clamp member presses the second damping material.

2. The clamp-on type ultrasonic flow sensor according to claim 1, further comprising:

a first pressing member attached to the first clamp member and configured to press the first damping material against the pipe; and a second pressing member attached to the second clamp member and configured to press the second damping material against the pipe.

3. The clamp-on type ultrasonic flow sensor according to claim 2, wherein the first pressing member is a first thin leaf spring, both ends in a circumferential direction of which are arcuate cantilevers with respect to a fixed part attached to the first clamp member, and presses the first damping material against the pipe also in a direction different from a clamping direction of the first and second clamp members, and the second pressing member is a second thin leaf spring, both ends in the circumferential direction of which are arcuate cantilevers with respect to a fixed part attached to the second clamp member, and presses the second damping material against the pipe also in a direction different from the clamping direction of the first and second clamp members.

4. The clamp-on type ultrasonic flow sensor according to claim 3, wherein the first thin leaf spring has a semi-cylindrical shape and is disposed to surround the entire circumferential direction of the pipe and press the first damping material, and the second thin leaf spring has a semi-cylindrical shape and is disposed to surround the entire circumferential direction of the pipe and press the second damping material.

5. The clamp-on type ultrasonic flow sensor according to claim 1, wherein a space for allowing deformation of the first and second damping materials is formed between the first clamp member and the pipe and between the second clamp member and the pipe.

6. The clamp-on type ultrasonic flow sensor according to claim 1, wherein the first and second damping materials are formed by an elastic body.

7. The clamp-on type ultrasonic flow sensor according to claim 6, wherein the first pressing member is configured to retain a position and a posture of the first elastic couplant, and the second pressing member is configured to retain a position and a posture of the second elastic couplant.

8. The clamp-on type ultrasonic flow sensor according to claim 6, wherein the first pressing member includes a third slit extending along the axial direction, the first pipe contact section of the first elastic couplant being fit in the third slit, and the second pressing member includes a fourth slit extending along the axial direction, the second pipe contact section of the second elastic couplant being fit in the fourth slit.

9. The clamp-on type ultrasonic flow sensor according to claim 1, wherein at least one clamp member of the first and second clamp members includes a guide wall that guides the clamp member to the pipe when the clamp member supports the pipe.

10. The clamp-on type ultrasonic flow sensor according to claim 1, wherein the peripheral wall of the pipe includes a first excitation region with which a longitudinal wave of the ultrasonic wave emitted from the first incident/emitting surface of the first wedge collides and a second excitation region with which a longitudinal wave of the ultrasonic wave emitted from the second incident/emitting surface of the second wedge collides, the first excitation region of the pipe excites the ultrasonic wave that passes through the fluid flowing in the pipe and travels to the second ultrasonic element, and the second excitation region of the pipe excites the ultrasonic wave that passes through the fluid flowing in the pipe and travels to the first ultrasonic element.

11. The clamp-on type ultrasonic flow sensor according to claim 10, wherein the first damping material is attached to the pipe to surround the first excitation region, and the second damping material is attached to the pipe to surround the second excitation region.

12. The clamp-on type ultrasonic flow sensor according to claim 1, wherein the first wedge is provided to set an incident angle of a shearing wave of the ultrasonic wave transmitted from the first ultrasonic element with respect to the axial direction to a critical angle or more, and the second wedge is provided to set an incident angle of a shearing wave of the ultrasonic wave transmitted from the second ultrasonic element with respect to the axial direction to the critical angle or more.

13. The clamp-on type ultrasonic flow sensor according to claim 1, wherein an outer diameter of the pipe is 2 mm or more and 20 mm or less.

* * * * *